(12) United States Patent
Bussat et al.

(10) Patent No.: US 9,035,895 B2
(45) Date of Patent: May 19, 2015

(54) REDUNDANT SENSING ELEMENT SAMPLING

(71) Applicant: Apple Inc., Cupertino, CA (US)

(72) Inventors: Jean-Marie Bussat, Mountain View, CA (US); Steven P. Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 13/802,609

(22) Filed: Mar. 13, 2013

(65) Prior Publication Data

US 2014/0015774 A1    Jan. 16, 2014

Related U.S. Application Data

(60) Provisional application No. 61/671,648, filed on Jul. 13, 2012.

(51) Int. Cl.
*G06F 3/041* (2006.01)

(52) U.S. Cl.
CPC ................................. *G06F 3/0418* (2013.01)

(58) Field of Classification Search
None
See application file for complete search history.

(56) References Cited

U.S. PATENT DOCUMENTS

| | | | |
|---|---|---|---|
| 5,844,961 A | 12/1998 | McEvoy et al. |
| 5,872,834 A | 2/1999 | Teitelbaum |
| 5,995,630 A | 11/1999 | Borza |
| 6,041,410 A | 3/2000 | Hsu et al. |
| 6,181,807 B1 | 1/2001 | Setlak et al. |
| 6,323,846 B1 | 11/2001 | Westerman et al. |
| 6,518,560 B1 | 2/2003 | Yeh et al. |
| 6,556,935 B2 | 4/2003 | Morimura et al. |
| 6,570,557 B1 | 5/2003 | Westerman et al. |
| 6,628,810 B1 | 9/2003 | Harkin |
| 6,677,932 B1 | 1/2004 | Westerman |
| 6,719,200 B1 | 4/2004 | Wiebe |
| 6,766,040 B1 | 7/2004 | Catalano et al. |
| 6,888,536 B2 | 5/2005 | Westerman et al. |
| 6,914,517 B2 | 7/2005 | Kinsella |
| 6,930,707 B2 | 8/2005 | Bates et al. |
| 6,973,565 B2 | 12/2005 | Couillard |
| 7,039,224 B2 | 5/2006 | Harel et al. |
| 7,043,061 B2 | 5/2006 | Hamid et al. |
| 7,203,347 B2 | 4/2007 | Hamid et al. |
| 7,274,807 B2 | 9/2007 | Hillhouse et al. |
| 7,327,859 B1 | 2/2008 | Chau |
| 7,356,169 B2 | 4/2008 | Hamid et al. |
| 7,385,381 B1 | 6/2008 | Mainguet |
| 7,400,749 B2 | 7/2008 | Hillhouse |
| 7,474,773 B2 | 1/2009 | Chau |

(Continued)

OTHER PUBLICATIONS

Represent [online]. Dictionary.com 2015 [retrieved Jan. 30, 2015]. Retrieved from the Internet: <URL: <http://dictionary.reference.com/browse/represent?s=t>,p. 1.

*Primary Examiner* — Muhammad N Edun
(74) *Attorney, Agent, or Firm* — Brownstein Hyatt Farber Schreck, LLP

(57) ABSTRACT

A sensor system and method that adjusts sensor data to account for the presence of noise that causes variations in signal amplitude between sensor blocks and between sensor rows. In order to account for the presence of noise in a sensor apparatus, various embodiments apply a first adjustment to the sensor data to account for variations in signal amplitude that occur from block to block. Various embodiments may also apply a second adjustment to the sensor data to account for variations in signal amplitude that occur from row to row.

20 Claims, 35 Drawing Sheets

(56) References Cited

U.S. PATENT DOCUMENTS

| | | |
|---|---|---|
| 7,599,530 B2 | 10/2009 | Boshra |
| 7,616,786 B2 | 11/2009 | Setlak |
| 7,616,787 B2 | 11/2009 | Boshra |
| 7,688,314 B2 | 3/2010 | Abdallah et al. |
| 7,770,019 B2 | 8/2010 | Ferren et al. |
| 7,894,685 B2 | 2/2011 | Zhai et al. |
| 7,953,258 B2 | 5/2011 | Dean et al. |
| 7,970,185 B2 | 6/2011 | Kim et al. |
| 7,990,269 B2 | 8/2011 | Bork et al. |
| 8,073,204 B2 | 12/2011 | Kramer et al. |
| 8,131,026 B2 | 3/2012 | Benkley et al. |
| 8,190,907 B2 | 5/2012 | Tu |
| 8,411,913 B2 | 4/2013 | Zhang et al. |
| 8,520,913 B2 | 8/2013 | Dean et al. |
| 8,577,091 B2 | 11/2013 | Ivanov et al. |
| 8,625,861 B2 | 1/2014 | Aggarwal et al. |
| 8,698,594 B2 | 4/2014 | Erhart et al. |
| 2003/0129965 A1 | 7/2003 | Siegel |
| 2003/0172027 A1 | 9/2003 | Scott |
| 2006/0104483 A1 | 5/2006 | Harel et al. |
| 2006/0188132 A1 | 8/2006 | Shigeta et al. |
| 2007/0081698 A1 | 4/2007 | Hamid et al. |
| 2008/0317306 A1 | 12/2008 | Hamilton |
| 2009/0083850 A1 | 3/2009 | Fadell et al. |
| 2011/0084711 A1 | 4/2011 | Chang et al. |
| 2011/0223888 A1 | 9/2011 | Esaki |
| 2012/0075452 A1 | 3/2012 | Ferren |
| 2012/0249433 A1* | 10/2012 | Deng et al. .................... 345/173 |
| 2013/0101186 A1 | 4/2013 | Walch et al. |
| 2013/0294660 A1 | 11/2013 | Heilpern |
| 2014/0003680 A1 | 1/2014 | Marciniak et al. |
| 2014/0003682 A1 | 1/2014 | Vieta et al. |
| 2014/0219520 A1 | 8/2014 | Myers |
| 2015/0071507 A1 | 3/2015 | Setlak |

* cited by examiner

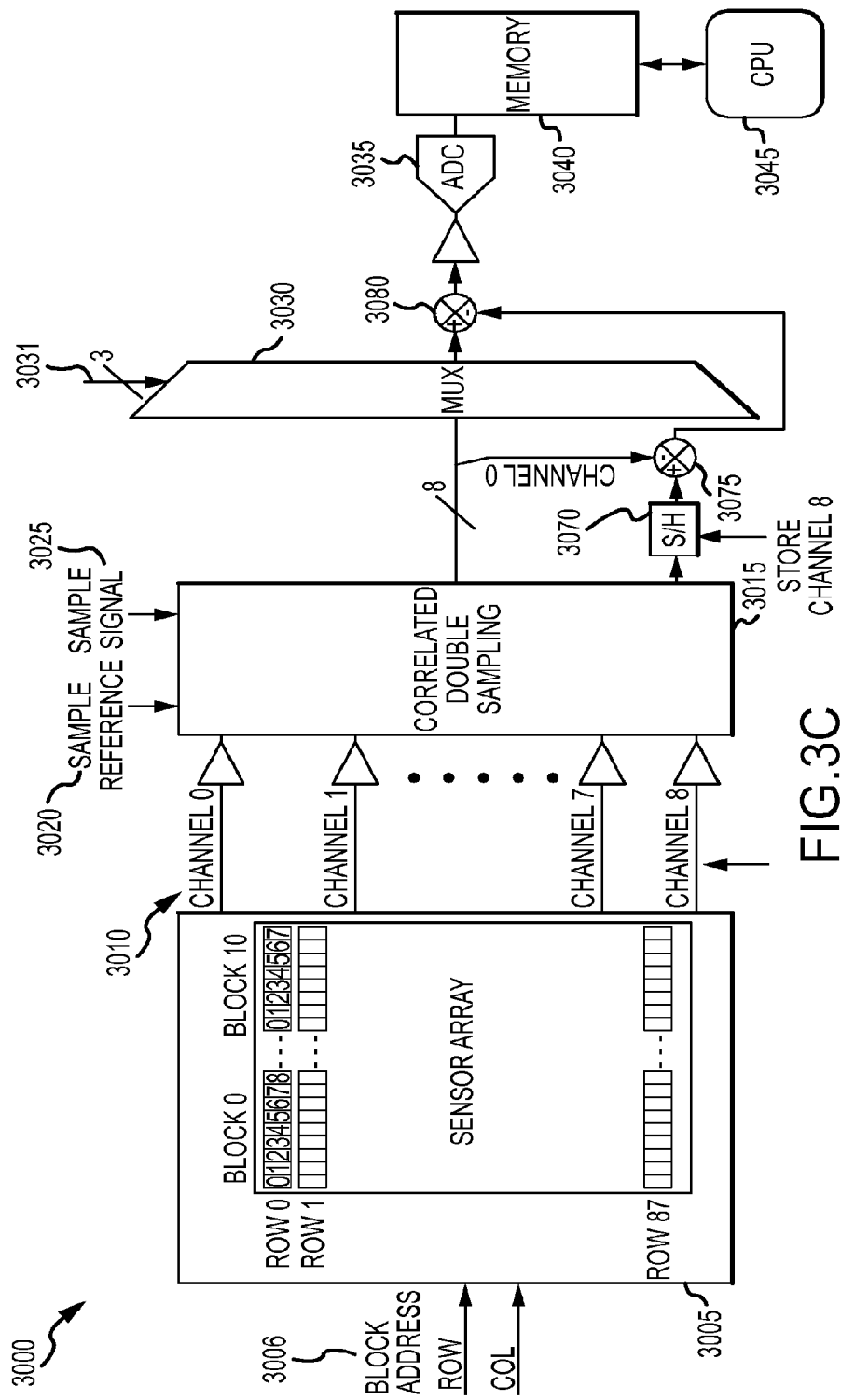

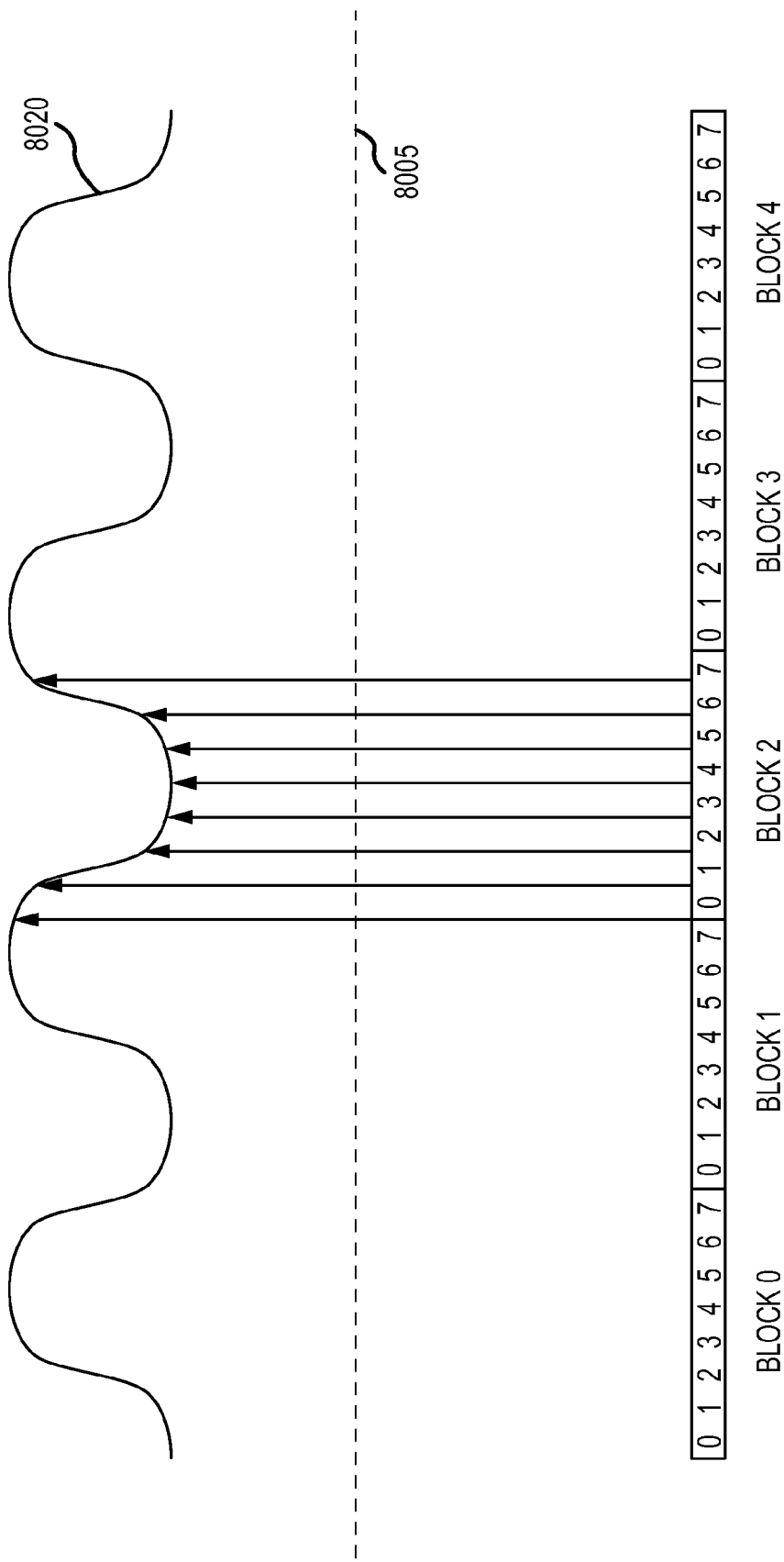

REDUNDANT SENSING ELEMENT SAMPLING

CROSS-REFERENCE TO RELATED APPLICATION

The present application claims the benefit under 35 U.S.C. §119(e) to U.S. Provisional Patent Application No. 61/671,648, which was filed on Jul. 13, 2012, and entitled "Redundant Sensing Element Sampling," which is incorporated by reference as if fully disclosed herein.

TECHNICAL FIELD

The present invention relates generally to methods that adjust sensor data to account for the presence of noise.

BACKGROUND

When sensor elements are read in the presence of noise, the noise can degrade the performance of the sensor. When sensing elements are read sequentially, the noise degrades the performance of the sensor by introducing inconsistent signal amplitude variations into the data values that are read from the sensing elements. For touch screen sensors, capacitive finger-print sensors, or other sensor devices that read sensor elements in blocks, these signal amplitude variations can be significant from block-to-block. When these sensors also read sensor elements in rows, these signal amplitude variations can be significant from row-to-row in the event that the touch screen contains a number of rows of sensing element blocks. For these and other reasons, there is a need to reduce the effect of noise in sensors devices.

SUMMARY

Examples of embodiments described herein may take the form of a sensor system and method that adjusts sensor data to account for the presence of noise that causes variations in signal amplitude between sensor blocks and between sensor blocks in different rows. The sensor system may include a sensor apparatus that is a component of a touch screen sensor, capacitive finger-print sensor, or other similar type of sensing device. In order to account for the presence of noise in a sensor apparatus, various embodiments apply a first adjustment to the sensor data to account for variations in signal amplitude that occur from block to block. Various embodiments may also apply a second adjustment to the sensor data to account for variations in signal amplitude that occur from row to row.

A sensor apparatus in accordance with various embodiments contains a redundant sensing element in at least some blocks of sensing elements. When the system scans a block, the redundant sensing element is sampled a first time. The redundant sensing element is then sampled a second time (at a later time) when the system scans the next subsequent block. In applying a block-to-block adjustment to the sensor data, the system calculates a difference in signal amplitude between the first and second samplings of the redundant sensing element. The system then subtracts out this difference from the measured signal amplitude for all sensor elements in the block where the redundant sensing element was sampled the second time. In this way, the system applies a block-to-block adjustment for each block. Prior to the block-to-block adjustment, each block within a row might contain a different amount of error. After the system applies the block-to-block adjustment to a row of blocks, each block within the row contains approximately the same amount of error.

After the system applies the block-to-block adjustment, the amount of error is the same within a row, but the amount of error might differ from row to row. The system applies a row-to-row adjustment to attempt to minimize these differences. In one embodiment, the system uses sensing element data indicative of a "no touch" to first adjust the rows with respect to each other, and then to adjust all rows with respect to a global DC offset. In other embodiments, the system adjusts the rows based on the gray scale difference between the rows. The system may also adjust the rows such that each row has the same average data value. In another embodiment, the system adjusts the rows using a redundant sensing element that is sampled once at the end of a row scan, and then a second time at the beginning of the next subsequent row scan.

BRIEF DESCRIPTION OF THE DRAWINGS

FIG. 3C is a diagram of a sensor apparatus in accordance with embodiments discussed herein where a block-to-block adjustment is applied in analog hardware;

FIGS. 8A-8E are diagrams showing the first five block reads of an 8-bit non-overlapping scan in the presence of the noise pattern shown in FIG. 7;

DETAILED DESCRIPTION

Figure 1:
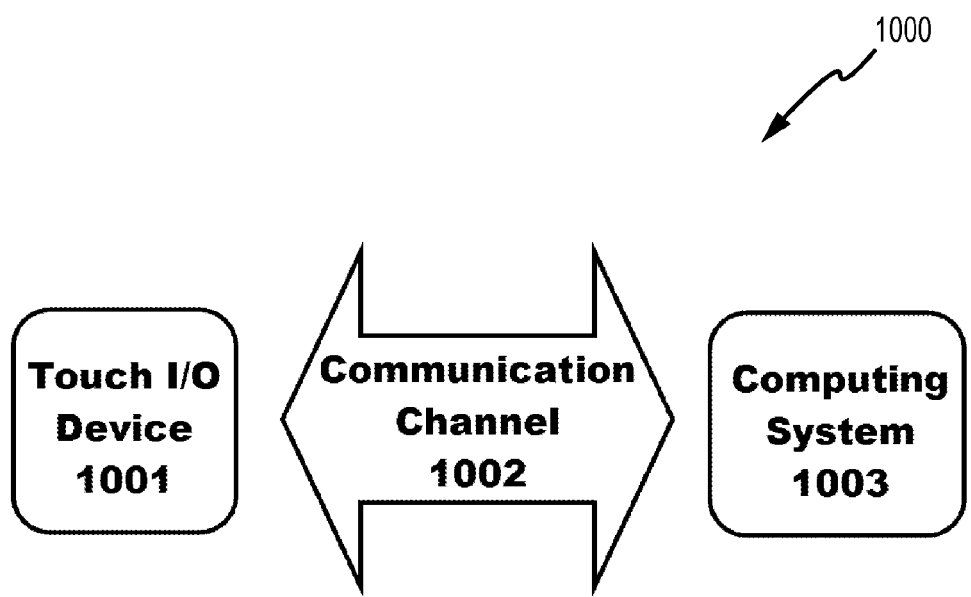
FIG. 1 is a schematic illustration of a electronic device embodiment that includes a touch screen device provided in association with a computing system.

This disclosure relates generally to a sensor system and method that adjusts sensor data to account for the presence of noise. The sensor system may include a sensor apparatus that is a component of a touch screen sensor, capacitive finger-print sensor, or other similar type of sensing device. Embodiments described herein may be configured to operate with a variety of sensors, including strip or swipe sensors, array or other two-dimensional sensors, and the like. A sensor apparatus in accordance with embodiments discussed herein contains a number of sensing elements that are arranged in rows where each row contains a number of blocks. The system generates sensor data by sequentially scanning each sensing element of the sensor apparatus. Specifically, the system sequentially scans each row, block-by-block. In order to account for the presence of noise in the sensor apparatus, the system applies a first adjustment to the sensor data to account for variations in signal amplitude that occur from block to block. The system then applies a second adjustment to the sensor data to account for variations in signal amplitude that occur from row to row.

A sensor apparatus in accordance with various embodiments contains a redundant sensing element in at least some blocks of sensing elements. Specifically, adjacent blocks overlap such that the last sensing element of a block is also the first sensing element in the next subsequent block. When the system scans a block, the redundant sensing element is sampled a first time. The redundant sensing element is then sampled a second time (at a later time) when the system scans the next subsequent block. In applying the first adjustment to the sensor data, the system calculates a difference in signal amplitude between the first and second samplings of the redundant sensing element. The system then subtracts out this difference from the measured signal amplitude for all sensor elements in the block where the redundant sensing element was sampled the second time. In this way, the system applies a block-to-block adjustment for each block. In some cases, no adjustment is applied to the first block in the row because no block was scanned prior to the first block and so no redundant sensing element data is available for the system to calculate an adjustment.

The presence of noise in the sensor system introduces an error into the data value that is read when the system samples each individual sensing element. Prior to the block-to-block adjustment, each block within a row might contain a different amount of error. After the system applies the block-to-block adjustment to a row of blocks, each block within the row contains approximately the same amount of error. Specifically, each block within the row contains the amount of error introduced when the first block was scanned. At this point, the amount of error is the same within a row, but the amount of error might differ from row-to-row. The system applies a row-to-row adjustment to at least eliminate these differences. In one embodiment, the system uses sensing element data indicative of a "no touch" to first adjust the rows with respect to each other, and then to adjust all rows with respect to a global DC offset. In other embodiments, the system adjusts the rows based on the gray scale difference between the rows. The system may also adjust the rows such that each row has the same average data value. In another embodiment, the system adjusts the rows using a redundant sensing element that is sampled once at the end of a row scan, and then a second time at the beginning of the next subsequent row scan.

The following terminology is exemplary, and not intended to be limiting in any way. In the description of various embodiments, the text "sensing element" or "capacitive sensing element" refers to a component of a touch screen sensor, capacitive finger-print sensor, or other similar type of sensing device. More generally, the text "sensing element" or "capacitive sensing element", and variants thereof, generally refers to one or more data elements of any kind, including information sensed with respect to individual locations. For example and without limitation, a sensing element or capacitive sensing element can include data or other information with respect to a relatively small region of a fingerprint image or touch screen image. After reading this application, those skilled in the art would recognize that these statements of terminology would be applicable to techniques, methods, physical elements, and systems (whether currently known or otherwise), including extensions thereof inferred or inferable by those skilled in the art after reading this application.

FIG. 1 is a schematic illustration of an electronic device 1000 in accordance with embodiments discussed herein. As shown in FIG. 1, an electronic device 1000 embodiment may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like.

A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen. In still other embodiments, a gesture may include presenting a finger and a fingerprint being read for identification purposes.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 2:
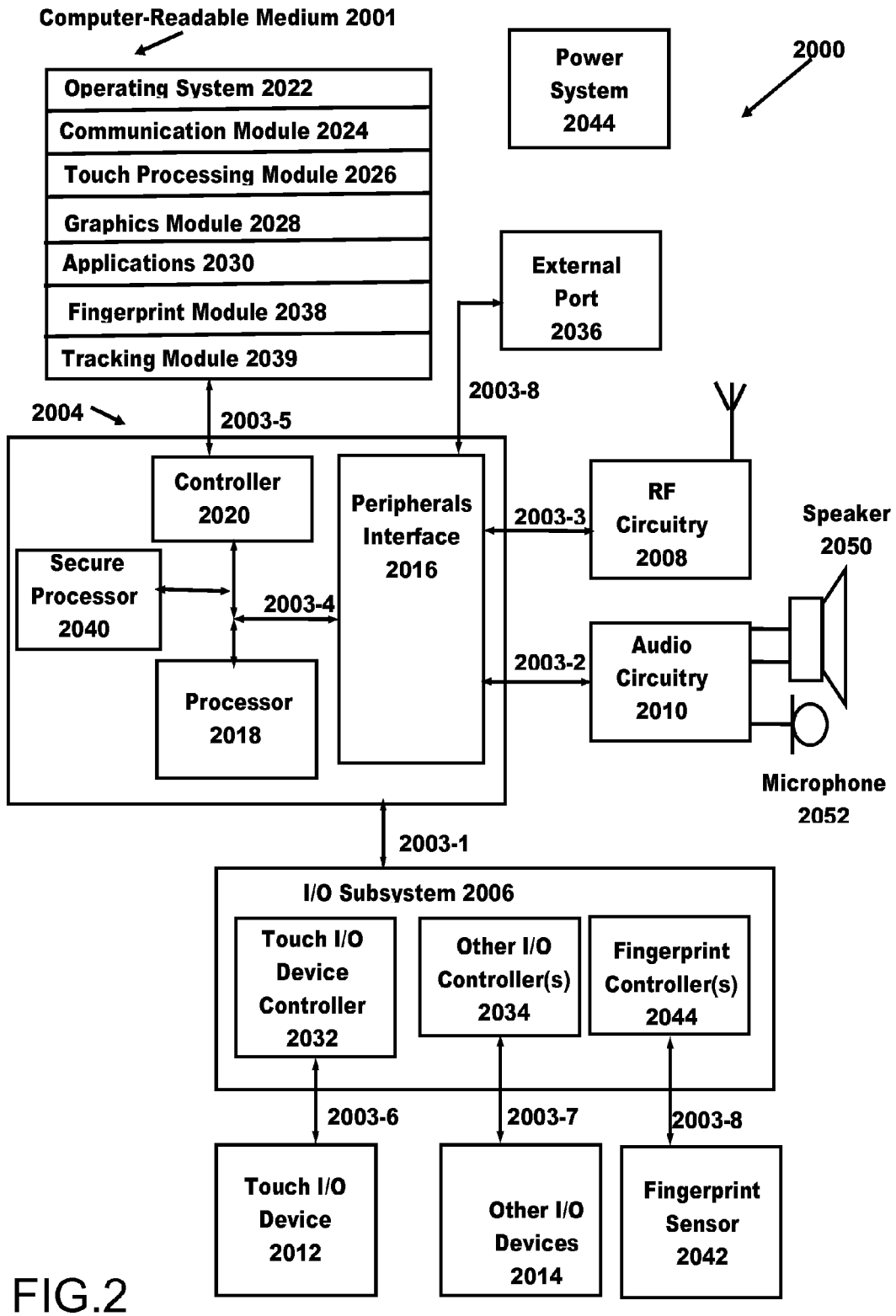
FIG. 2 is a schematic illustration of system architecture for the electronic device shown in FIG. 1.

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 2 is a block diagram of one embodiment of system 2000 that generally includes one or more computer-readable mediums 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in FIG. 2 is only one example architecture of system 2000, and that system 2000 could have more or fewer components than shown, or a different configuration of components. The various components shown in FIG. 2 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include a fingerprint sensing module 2038 that may at least function to perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. In one embodiment, the fingerprint sensor is a capacitive finger print sensor. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

In accordance with embodiments discussed herein, the system 2000 functions to sample an array of sensing elements that are associated with a touch screen, and to adjust the sensor data to account for the presence of noise. In one embodiment, the array of sensing elements may be associated with the fingerprint sensor 2042. In alternative embodiments, the array of sensing elements is associated with the touch I/O device 2012. In connection with these various embodiments, the touch processing module 2026 and/or the fingerprint sensing module 2038 may execute or cause certain hardware element to execute operations that acquire sensor data and process the sensor data to account for the presence of noise. Generally, the touch processing module 2026 and/or the fingerprint sensing module 2038 are configured to perform the method/functions as described in connection with FIGS. 5, 6, and 13-20.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. The operation of these various elements will now be described.

The fingerprint sensor 2042 may operate to capacitively capture a series of images, or nodes. When taken together, these nodes may form a fingerprint. The full set of nodes may be referred to herein as a "mesh."

Each node in the mesh may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. Generally, the fingerprint data is encrypted by any of the fingerprint sensor 2042, the fingerprint I/O controller 2044 or another element prior to being transmitted to either processor. The secure processor 2040 may decrypt the data to construct the node.

Fingerprint data, either as nodes or meshes, may be stored in the computer-readable medium 2001 and accessed as necessary. In some embodiments, only the secure processor 2040 may access stored fingerprint data, while in other embodiments either the secure processor or the processor 2018 may access such data.

Figure 3A:
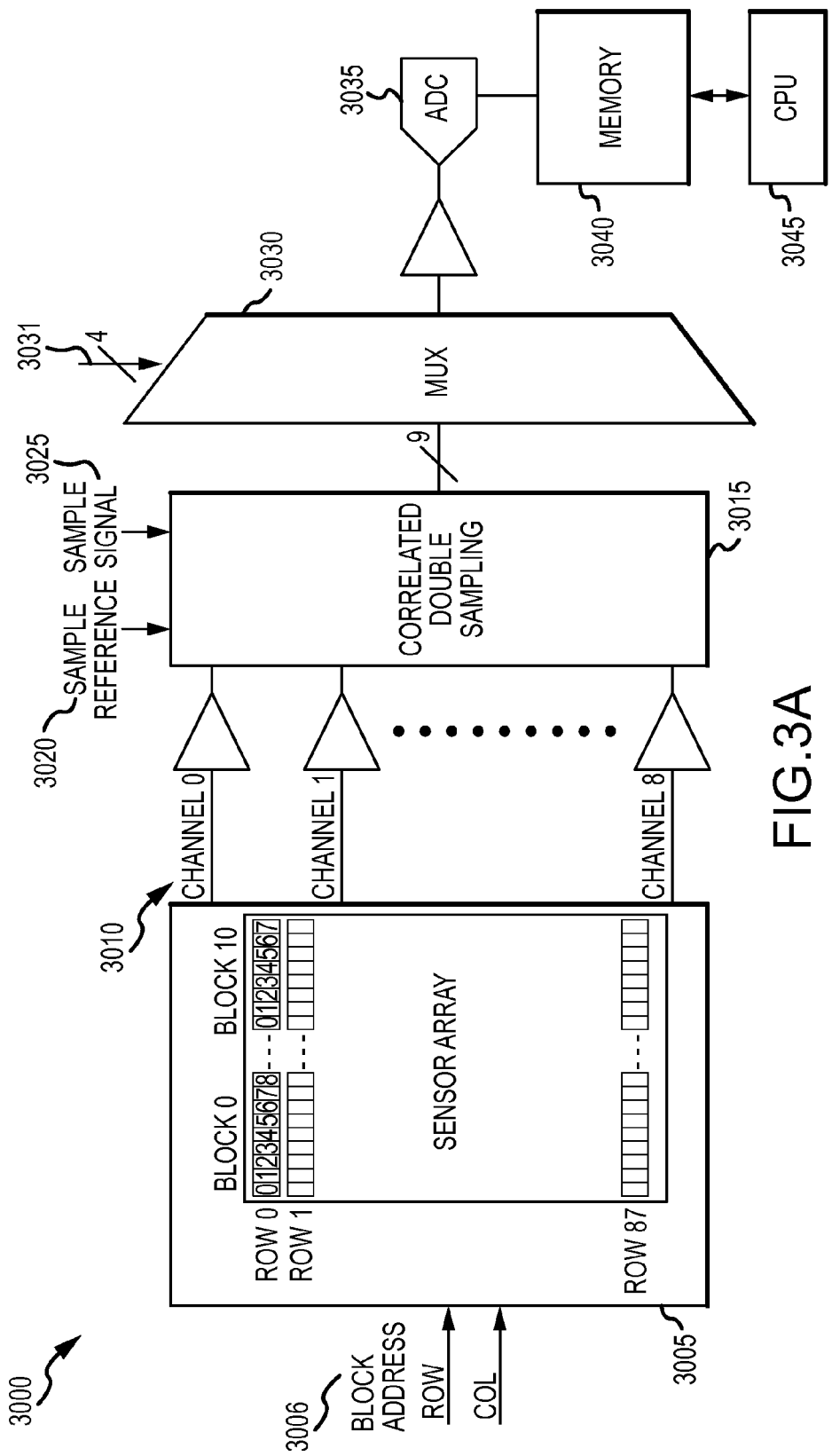
FIG. 3A is a diagram of a sensor apparatus in accordance with embodiments discussed herein where a block-to-block adjustment is applied in software.

FIG. 3A is a diagram of a sensor apparatus 3000 in accordance with embodiments discussed herein. The sensor apparatus 3000 may be configured to receive various types of input, such as touch input from a touch screen, input from a capacitive finger-print sensor, or input from other similar types of devices. In this regard, a sensor apparatus 3000 may correspond to or be a component of the touch I/O device 2012 or to the fingerprint sensor 2042 shown in FIG. 2. As shown in FIG. 3A, the sensor apparatus 3000 includes a sensor array 3005. The example sensor array 3005 shown in FIG. 3A is an 88×88 array of sensing elements. The sensing elements of each row in the sensor array 3005 are divided among eleven sensing element blocks. The sensor array 3005 includes addressing inputs 3006 that may be used to address a particular block in the sensor array 3005. The sensor array 3005 additionally includes a read channel 3010 that outputs the analog value of each sampled sensing element in the block addressed by the block addressing inputs 3006. It should be appreciated that the number of sensing elements shown in FIG. 3A is by way example and not limitation. Other sensing arrays containing different numbers of rows, block and/or sensing elements may be used consistent with embodiments discussed herein.

A sensor apparatus 3000 in accordance with various embodiments contains a redundant sensing element in at least some blocks of sensing elements. In FIG. 3A, the sensing elements of each row in the sensor array 3005 are divided among eleven sensing element blocks and the first ten blocks contain a redundant sensing element. In one embodiment, the last sensing element in a particular block is the redundant sensing element. Specifically, each of the first nine blocks overlap with the next subsequent block such that the last sensing element of the block is also the first sensing element in the next subsequent block. In FIG. 3A, the eleventh block in each row does not have a redundant sensing element because this block is the last in the row and thus is not associated with a subsequent block in the row. As used herein, when a sensing element is redundantly sampled when the system scans two sequential blocks, the sensing element that is sampled twice is referred to as the "redundant sensing element" when referring to the first block scanned. When referring to the second block scanned, the sensing element that is sampled twice is referred to as sensing element 0, element 0, or bit 0.

In FIG. 3A, blocks that have a redundant sensing element have nine sensing elements, and the ninth sensing element is the redundant sensing element. Blocks that do not have a redundant sensing element have eight sensing elements. The redundant sensing element is sampled a first time when the system scans the block having the redundant sensing element. The redundant sensing element is then sampled a second time (at a later time) when the system scans the next subsequent block. For example, the ninth sensing element in the first block of the sensor array 3005 is a redundant sensing element. This redundant sensing element is sampled a first time when block 0 of row 0 is scanned. The redundant sensing element is then sampled a second time when block 1 of row 0 is scanned.

The sensor apparatus 3000 contains a correlated double sampling block 3015 that is configured to receive analog output from the sensor array 3005. Specifically, the correlated double sampling block 3015 is connected to the outputs of the read channel 3010. The read channel 3010 includes 9 individual read channels 0-8. When the values from the sampled sensing elements are read out from the sensor array, the value of the redundant sensing element is read out on channel 8 of the read channel 3010. The correlated double sampling block 3015 includes two control inputs, a sample reference input 3020 and a sample signal control input 3025. The correlated double sampling block 3015 operates by first receiving a control signal on the sample reference input 3020. In response to receiving this input, the correlated double sampling block 3015 measures a reference voltage level that is present in the readout channel 3010. Following this, the correlated doubling sampling block 3015 receives a control input on the sample signal input 3025. In response to this input, the correlated double sampling block samples the read channel 3010.

The correlated double sampling block 3015 contains a nine channel output that is connected to a multiplexer 3030. The multiplexer 3030 contains a four-channel control signal input 3031. The multiplexer 3030 operates to sequentially read the nine channel values stored in the correlated double sampling block 3015, and to sequentially pass those values to an analogue-to-digital converter 3035. Specifically, the multiplexer 3030 receives a sequence of inputs on the control lines 3031 which address each nine channel value in order as they are stored on the correlated double sampling block 3015. Once the sensor data values are read out from the analogue-to-digital converter 3035, the data values are stored on a memory device 3040. The memory device 3040 is provided in association with a CPU 3045. Referring to FIG. 2, the memory 3040 may correspond to the at least a portion of the computer-readable medium 2001. The CPU 3045 may correspond to the processor 2018 and/or the secure processor 2040, or the touch IO device controller 2032.

Figure 4:
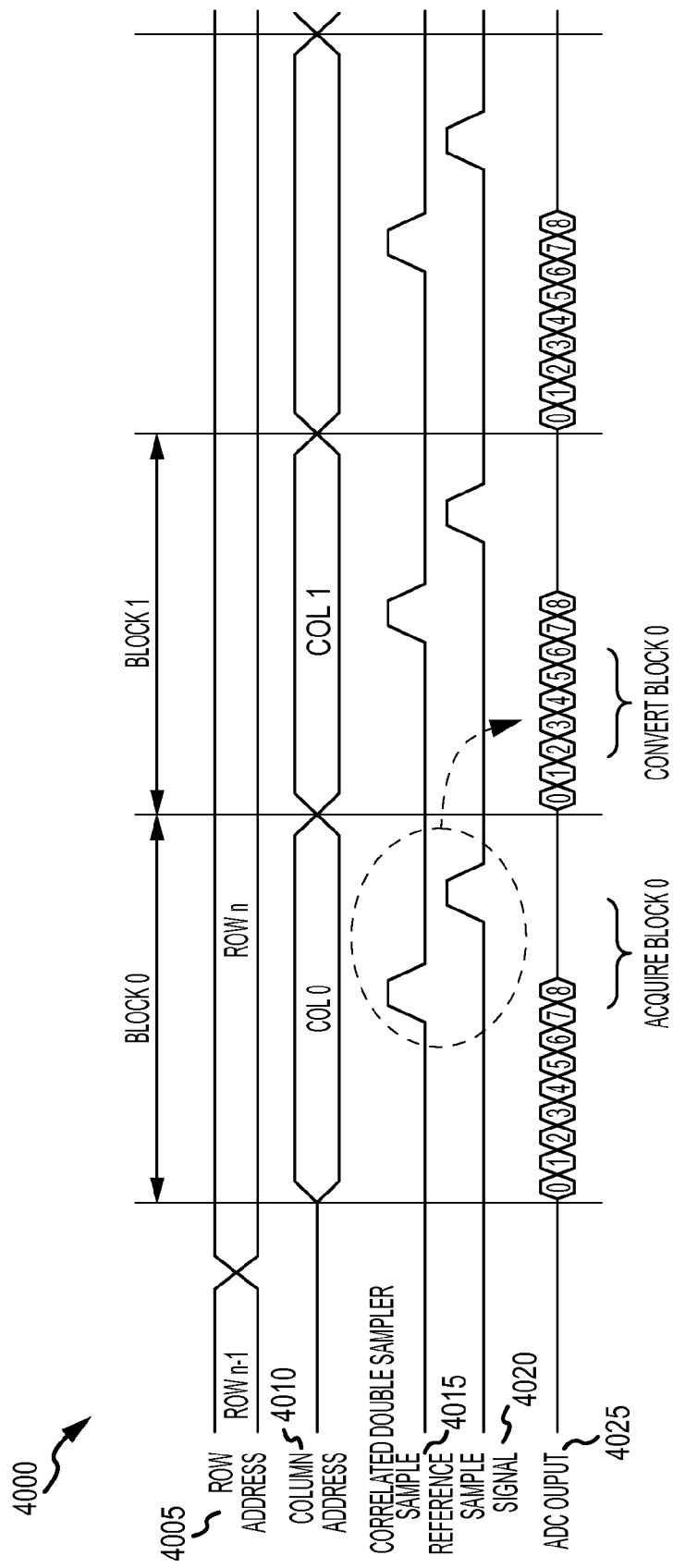
FIG. 4 is a timing diagram for the sensor apparatuses shown in FIGS. 3A-3C.

FIG. 4 is a timing diagram 4000 for the sensor apparatus 3000 shown in FIG. 3A. The timing diagram 4000 includes a row address signal 4005 and a column address signal 4010. These address signals correspond to the block address inputs 3006 shown in FIG. 3A. The timing diagram shown in FIG. 4 also includes a sample reference signal 4015 and a sample signal 4020. These input signals correspond to the control inputs 3020 and 3025 for the correlated double sampling block 3015 shown in FIG. 3A. The timing diagram 4000 shown in FIG. 4 additionally includes an analogue-to-digital converter output signal 4025 corresponding to the output from the analogue-to-digital converter 3035 shown in FIG. 3A.

As shown in FIG. 4, the row address 4005 and column address 4010 signals become stable and, at that point, a signal is output from the sensing array 3005 that represents a sampling of each sensing element in the block addressed by the data values on the row address 4005 and column address 4010 signal inputs. Once the row address 4005 and column address 4010 signals are stable, a sample reference input 4015 is sent to the correlated double sampling block 3015 causing the correlated double sampling block 3015 to measure a reference voltage level that is present in the readout channel 3010. Following this, a sample input signal 4020 is input to the correlated double sampling block 3015 causing the correlated double sampling block 3015 to sample the readout channel 3010. As shown in FIG. 4, the data values acquired are then converted to digital form at a later time as shown by the outputs on the analogue-to-digital output signal line 425.

FIG. 4 illustrates correlated double sampling being performed in the analog domain, where the correlated double sampling block 3015 measures the difference between the reference signal captured and the sample signal captured in the analogue domain. Following this, the analog signal is fed through the multiplexer 3031 to the analog to digital converter 3035. In accordance with alternate embodiments, each reference signal may be passed directly to the multiplexer 3031 and the analog to digital converter 3035. Similarly, each sample signal may be passed directly to the multiplexer 3031 and the analog to digital converter 3035. Following this, the differences between reference and sample signals may be found in the digital domain after the analog to digital converter 3035.

Figure 5:
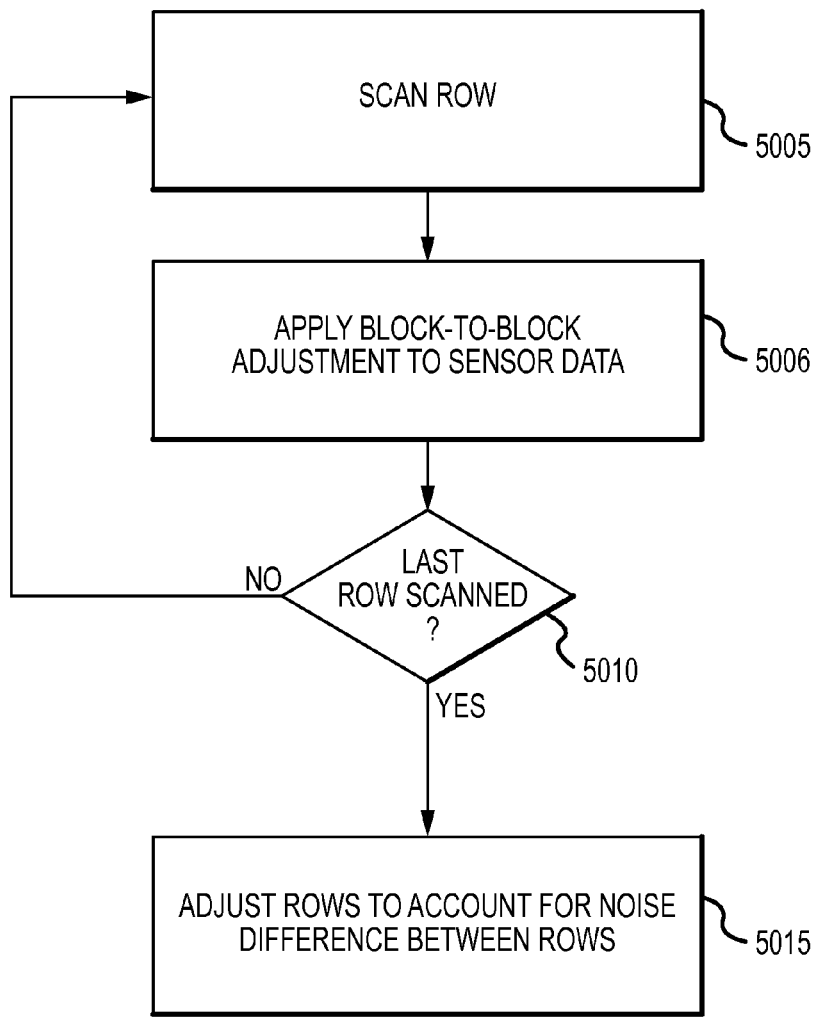
FIG. 5 is a flow chart illustrating a scanning method in accordance with various embodiments.

FIG. 5 is a flow chart illustrating a scanning method in accordance with various embodiments. In the following discussion, the scanning method 5000 is explained as being performed by operations of the touch processing module 2026. It should be appreciated, however, that the scanning method 5000 may also be performed by operations of the fingerprint sensing module 2038 or other modules associated with the example system 2000 shown in FIG. 2. The operations illustrated in FIG. 5 may include the touch processing module 2026 sending appropriate command signals to the sensor array 3005, the correlated double sampling block 3015, or other components of the sensor apparatus 3000 shown in FIG. 3A.

Initially, in operation 5005, the touch processing module 2026 scans a row in the sensor array 3005. Each row of the sensor array 3005 includes a number of sensing elements arranged in blocks. Accordingly, in operation 5005, the touch processing module 2026 may cause an appropriate series of control signals to be sent to the sensor array 3005, the correlated double sampling block 3015, or other components of the sensor apparatus 3000 such that the sensor data to readout from the sensor array 3005 and stored in memory 3040. Following operation 5005, operation 5006 may be executed.

In operation 5006, a block-to-block adjustment is applied to the sensor data received in the row scan. The block-to-block adjustment is applied to account for variations in noise levels they occur between block scans. In one embodiment, the touch processing module 2026 applies the block-to-block adjustment by executing a series of software operations on sensor data that is stored in memory 3040. An example method by which the touch processing module 2026 may apply a block-to-block adjustment is described in more detail in connection with FIG. 6. In accordance with alternative embodiments, digital or analog hardware components apply a block-to-block adjustment after each block of sensor data is readout from the sensor array 3005 and before the sensor data is stored in memory 3040. Following operation 5006, operation 5010 may be executed.

In operation 5010, the touch processing module 2026 determines if the last row has been scanned. If the last row has not been scanned, control passes again to operation 5005 where the next subsequent row is scanned. If, in operation 5010, the touch processing module 2026 determines that the last row has been scanned, control passes to operation 5015.

In operation 5015, the touch processing module 2026 adjusts the data values for each of the rows to account for noise differences between the rows. This disclosure includes several embodiments by which the touch processing module 2026 may apply this row-to-row adjustment. These various embodiments are described in greater detail below.

Figure 6:
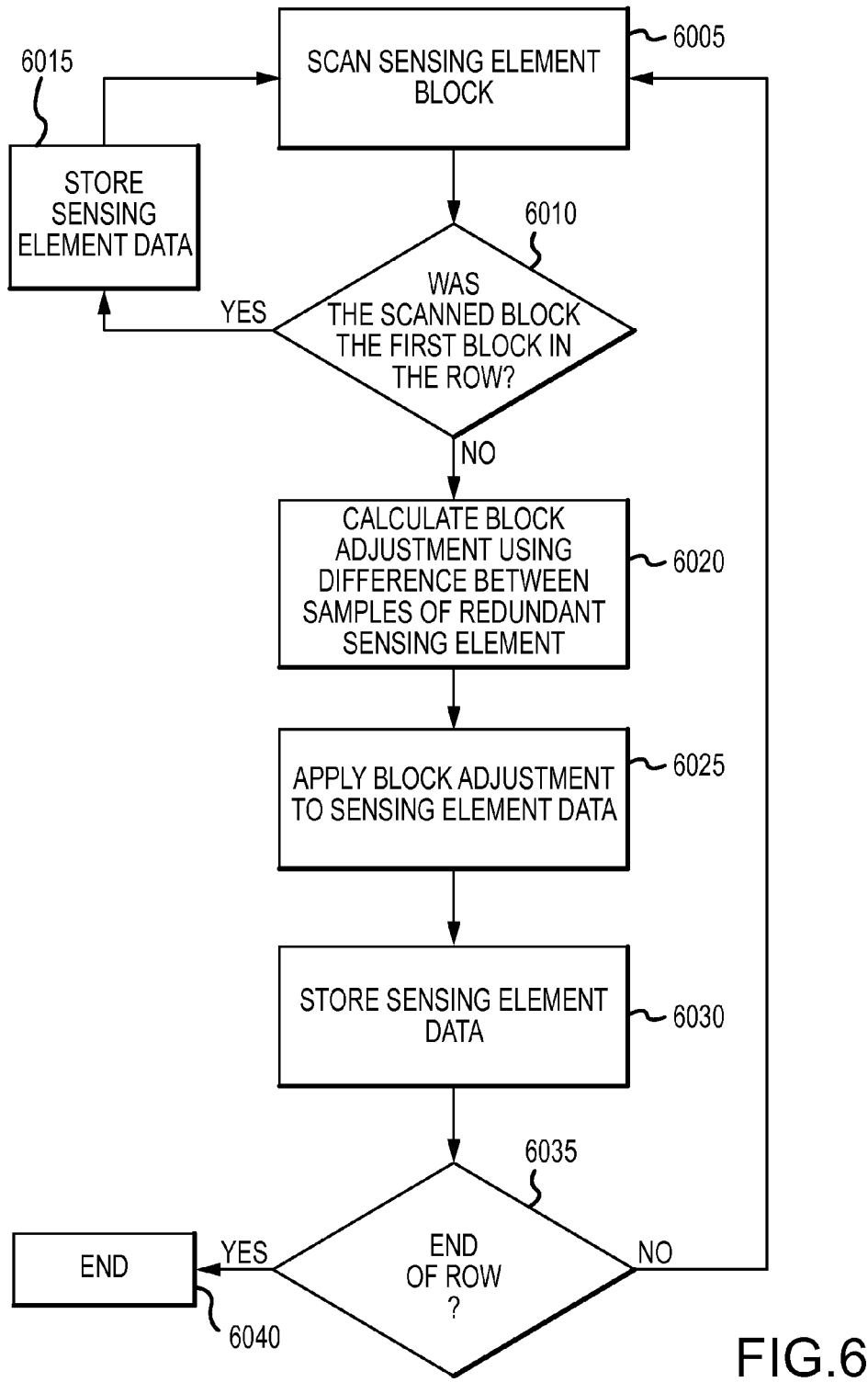
FIG. 6 is a flow chart further illustrating the row scanning and block-to-block adjustment operations shown in FIG. 5.

FIG. 6 is a flow chart that illustrates further operations of the touch processing module 2026 in connection with the row scanning 5005 and block-to-block adjustment operations 5006 shown in FIG. 5. Initially, in operation 6005 the touch processing module 2026 scans a sensing element block. Following operation 6005, control may pass to operation 6010.

In operation 6010, the touch processing module 2026 determines if the block that was scanned was the first block in a row. If the scanned block was the first block in a row, control passes to operation 6015. If not, control passes to operation 6020.

In operation 6015, the touch processing module 2026 stores the sensing element data acquired in operation 6005. During this operation 6015, the touch processing module 2026, or hardware associated with the sensor apparatus 3000, does not apply any block-to-block adjustment to the sensor data. As described above, the sensing element data for the first block is not adjusted because no prior block was scanned and therefore not redundant sensing element data exists to make a comparison for the adjustment.

In operation 6020, the touch processing module 2026 calculates a block adjustment using the difference between the two samples of the redundant sensing element. Following operation 6020, operation 6025 may be executed.

In operation 6025, the touch processing module 2026 applies the calculated adjustment to the sensing element data for the current block. Specifically, the touch processing module 2026 subtracts out the difference from the sensing element data of the block where the redundant sensing element was sampled for the second time. Following operation 6025, operation 6030 may be executed.

In operation 6030, the touch processing module 2026 stores the sensing element data including the adjustments applied in operation 6025. Following operation 6030, operation 6035 may be executed.

In operation 6035, the touch processing module 2026 determines if the final block in the row has been scanned. If, in operation 6035, the touch processing module 2026 determines that the last block has not been scanned, control again passes to operation 6005 where the next block is scanned. If, in operation 6005, the touch processing module 2026 determines that the last block has been scanned, control may pass to operation 6040 and the process of scanning a row may end.

As described above, the system applies adjustments to sensor data in order to compensate for noise in the sensor apparatus 3000. In the sensor apparatus shown in FIG. 3A, these adjustments are applied in software or firmware. Specifically, the unadjusted sensor data values are read into memory 3040 and adjusted by a software program running on the CPU 3045. The software or firmware approach as advantages in the amount of compensation can be flexibly controlled. Additionally, the software or firmware approach does not consume additional silicon area or silicon development schedule, and is relatively computationally inexpensive.

Figure 3B:
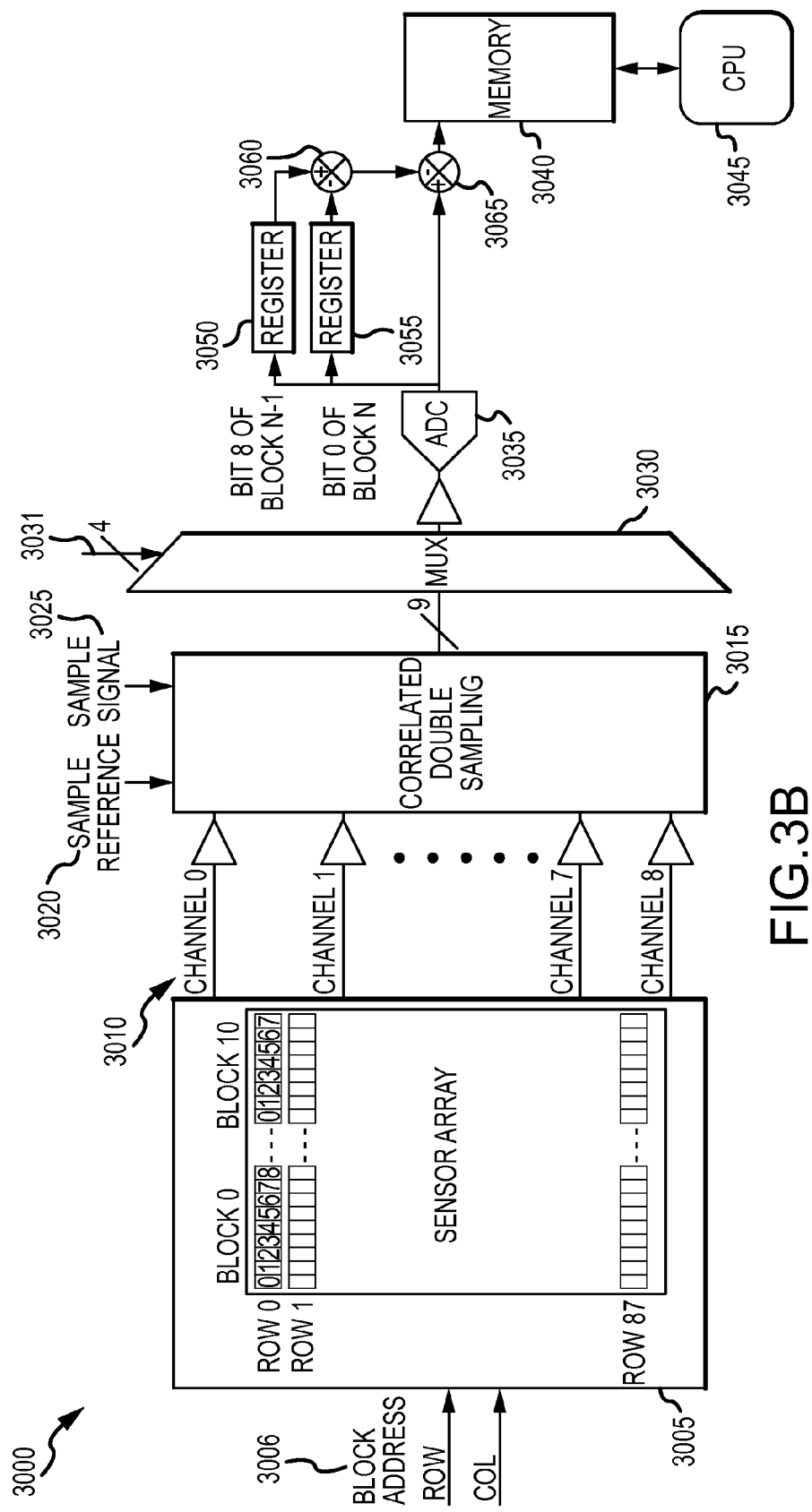
FIG. 3B is a diagram of a sensor apparatus in accordance with embodiments discussed herein where a block-to-block adjustment is applied in digital hardware.

FIGS. 3B and 3C illustrate alternative embodiments of a sensor apparatus 3000 where the block-to-block adjustments to the sensor data are done in hardware rather than software. In FIG. 3B, the adjustment is done digitally in hardware. As shown in FIG. 3B, the sensor apparatus 3000 may include a first register 3050 and a second register 3055. The first register 3050 stores a data value for a first sampling of a redundant sensing element. The second register 3055 stores a data value for the second sampling of the redundant sensing element. The registers 3050 and 3055 output to an adder 3060 that takes the difference between the two data values and applies that difference to the data values in the current sensing block through the operation of the adder 3065. The output of the adder 3065 connects to memory 3040 which is provided in association with the CPU 3045. In the embodiment shown in FIG. 3B, when sensor data is first stored in memory 3040, the block-to-block adjustment has already been applied.

FIG. 3C is a diagram that illustrates a sensor apparatus 3000 embodiment that performs the block-to-block adjustment in the analog portion of the circuit 3000. Here, the block-to-block adjustment is applied before the sensor data values are converted into a digital data stream by the operation of the multiplexer 3030. The sensor apparatus 3000 shown in FIG. 3C includes a data store element 3070 connected to the output of the correlated double sampling block 3015. The data store element 3070 is configured to store a data value for the redundant sampling element each time the read channel 3010 is sampled. The output of the data storage element 3070 is connected to an adder 3075. The adder 3075 includes an additional input from the output of the correlated double sampling block 3015, specifically, the one-bit channel 0 data value is input to the adder 3075. The adder 3075 subtracts the two data values received as its input and provides that output to a second adder 3080. The adder 3080 receives as input, the output from the multiplexer 3030. The adder 3080 operates to subtract out the difference between the two sampling of the redundant sensing element from each bit of the current block as the current block is read out from the multiplexer 3030. The output from the adder 3080 is then passed to the analog-to-digital converter 3035 and from there to the memory device 3040. As was the case in FIG. 3B, when the sensor values are first stored in memory 3040, the block-to-block adjustment has already been applied.

Figure 7:
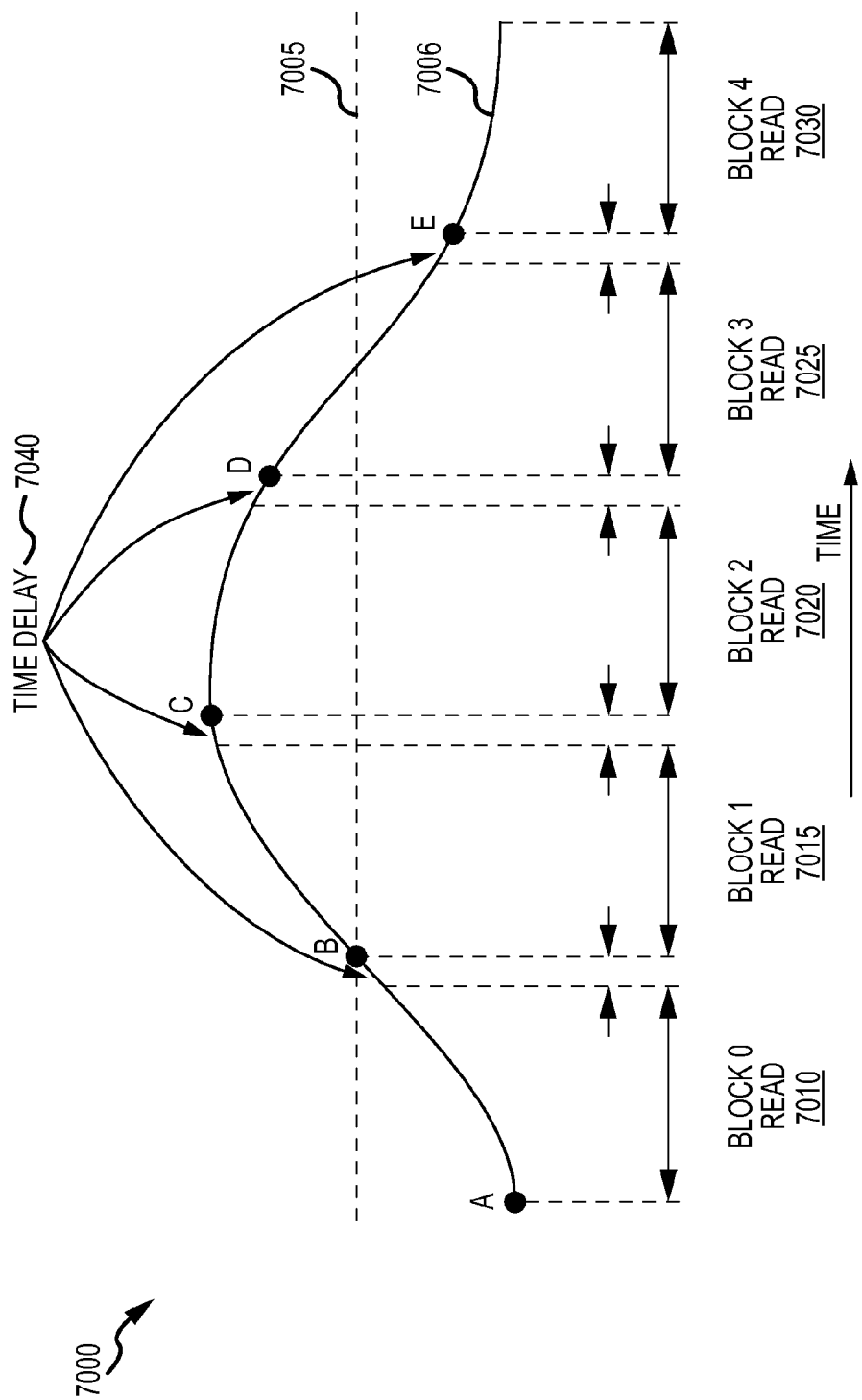
FIG. 7 is diagram showing an example noise pattern occurring during the scanning operation shown in FIG. 5.

In order to more clearly illustrate how present embodiments adjust sensor data to account for the presence of noise, reference is now made to FIG. 7. FIG. 7 is diagram 7000 showing an example noise pattern that may be present in the sensor apparatus 3000 as a number of blocks in a row are scanned. By way of example, FIG. 7 shows a read of five blocks in the presence of a idealized common mode noise pattern 7006. The noise pattern 7006 is illustrated with reference to a zero offset reference line 7005. As shown in FIG. 7, a row scan begins with a read of block 0. The read of block 0 occurs during the time interval 7010. Following the time interval 7010, a time delay 7040 occurs. After the time delay 7040, the read of block 1 occurs during the time interval 7015. In the same way, the read of block 2 occurs in time interval 7020, block 3 in time interval 7025, and block 4 in time interval 7030. Each block read time interval is separated by a time delay 7040 that occurs due to delays in the sensor apparatus 3000. As can be seen in FIG. 7, the level of noise present in the sensor apparatus 3000 will vary from block to block. For example, when the first block (Block 0) is read, the amount of noise present in the sensor apparatus 3000 corresponds to level A. When the third block (Block 2) is read, the amount of noise present in the sensor apparatus 3000 corresponds to level B, and so on.

The presence of noise in the sensor introduces an error into the data values that are read when the system scans each sensing element block. This error manifests as an offset from a certain zero-offset reference, such as ground. Because the sensing elements blocks are scanned sequentially and because the amount of noise in the sensor varies over time, a different error may occur in each sensing element block. The system applies the block-to-block adjustment to eliminate these differences.

Figure 8A:
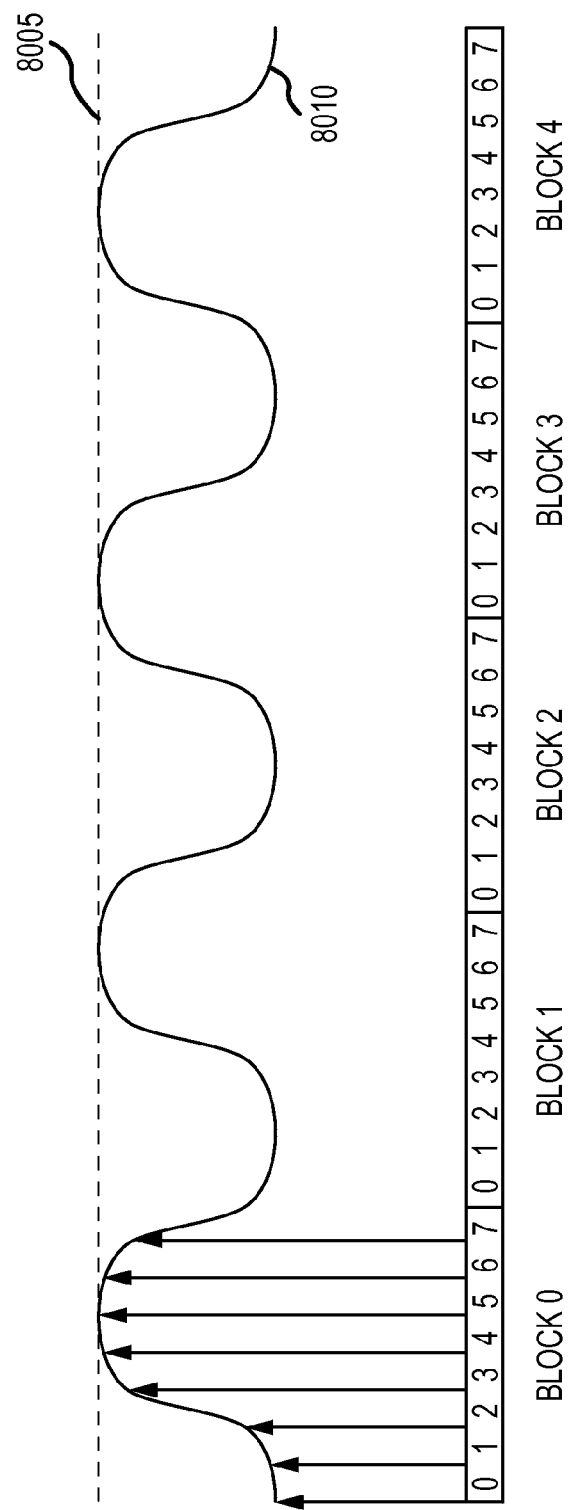
Figure 8B:
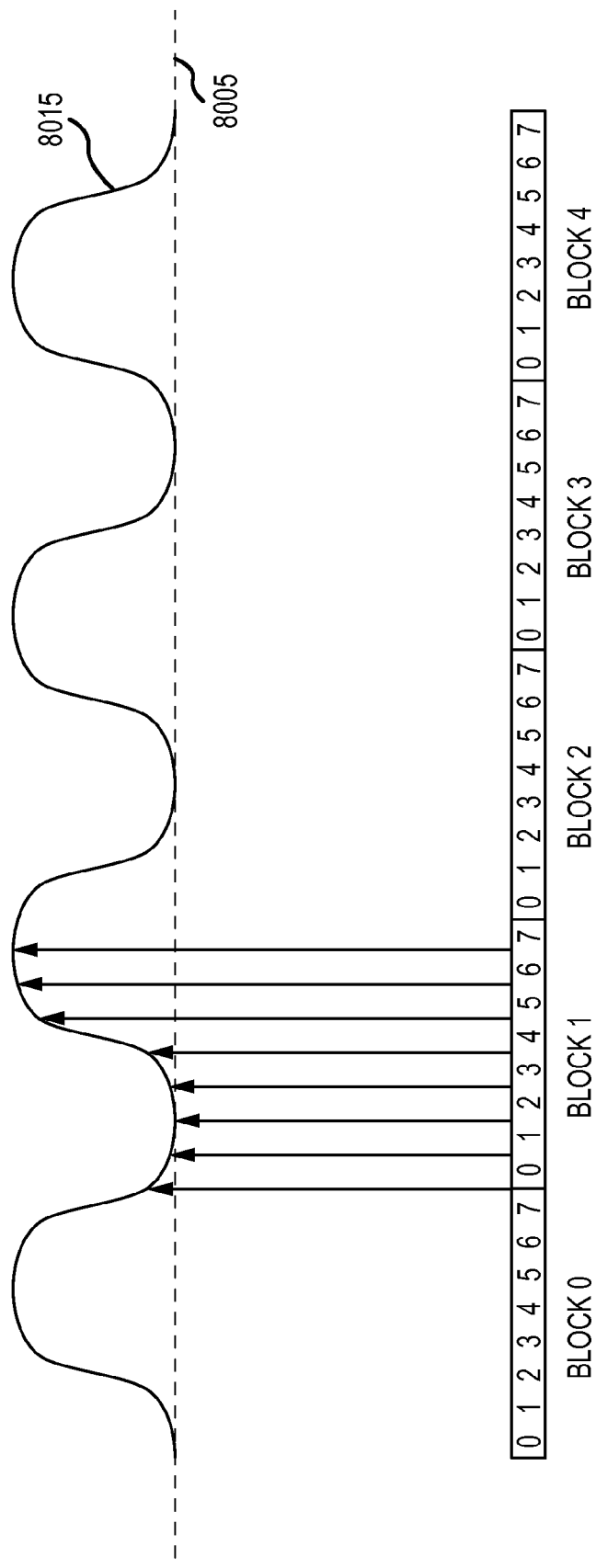
Figure 8D:
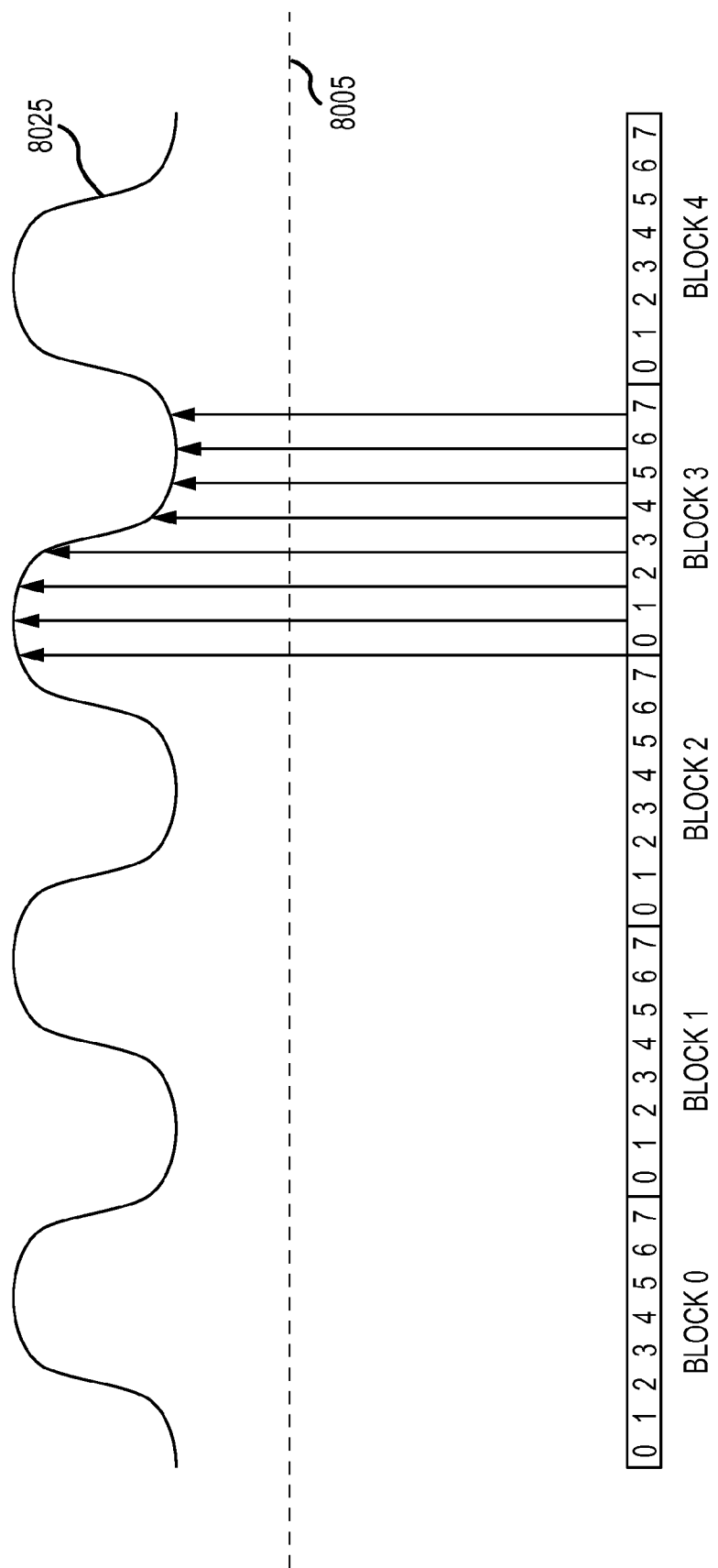
Figure 8E:
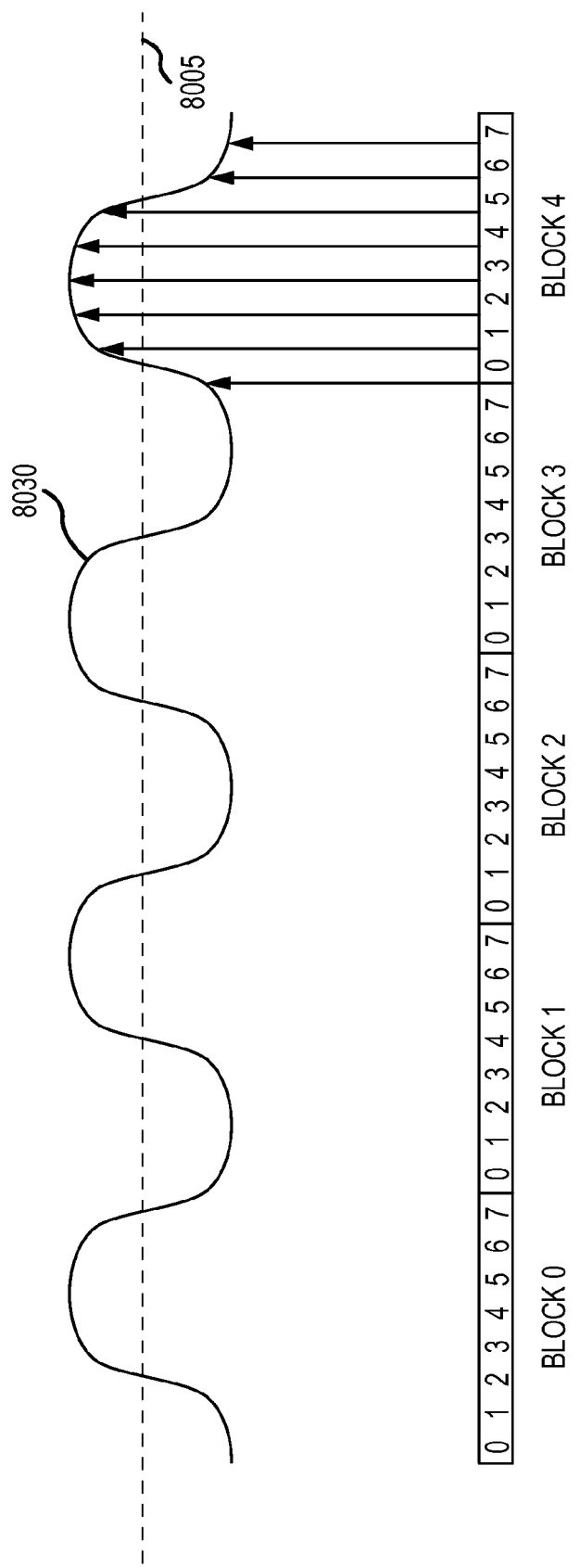

In order to more clearly illustrate how noise in the sensor apparatus 3000 introduces error into the sensor data values, reference is first made to FIGS. 8A-8E. FIGS. 8A-8E are diagrams showing the first five block reads of an 8-bit non-overlapping scan in the presence of the noise pattern 7006 shown in FIG. 7. In FIGS. 8A-8E, each individual block reads a portion of an example input signal, which in FIG. 8A is at position 8010. By way of example, the input signal is shown as an idealized sign wave pattern. In actuality, an input signal, such as a fingerprint signal or a touch screen input signal, that is received through the sensor apparatus 3000 may include different or varying patterns of signal amplitude. The example input signal is shown in relation to a zero-offset reference 8005. As time passes and the block reads occur, the noise pattern 7006 causes the example signal input pattern to move to different positions in relation to the zero-offset reference 8005.

Initially, in FIG. 8A, block 0 is scanned. As shown in FIG. 8A, the scan of block 0 includes a sampling of each sensing element in block 0. When the scan of block 0 occurs, the example input signal is in position 8010, offset from the zero-offset reference 8005 by an amount that corresponds to the amount of noise present in the sensor apparatus 3000 when the block 0 scan began. As shown in FIG. 7, this amount of noise corresponds to the level A. Similarly, when the scan of block 1 occurs (FIG. 8B), the example input signal is at position 8015, offset from the zero-offset reference 8005 by an amount that corresponds to the B noise level. When the scan of block 2 occurs (FIG. 8C), the example input signal is at position 8020, offset from the zero-offset reference 8005 by an amount that corresponds to the C noise level. When the scan of block 3 occurs (FIG. 8D), the example input signal is at position 8025, offset from the zero-offset reference 8005 by an amount that corresponds to the D noise level. When the scan of block 4 occurs (FIG. 8E), the example input signal is at position 8030, offset from the zero-offset reference 8005 by an amount that corresponds to the E noise level.

Figure 9:
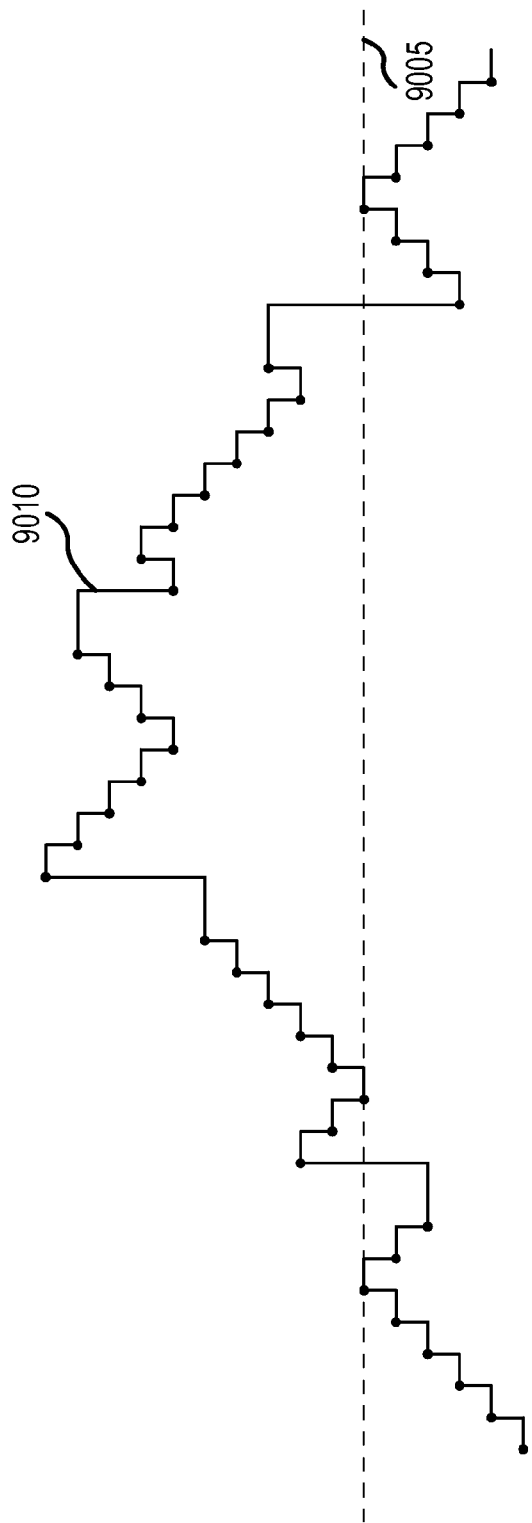
FIG. 9 is a diagram showing digitized scan results from the scan shown in FIGS. 8A-8E.

FIG. 9 shows digitized scan results 9010 that are output from the sensor apparatus 3000 as the sensor apparatus 3000 implements an eight-bit scan shown in FIGS. 8A-8E. Here, a redundant sensing element is not sampled twice and a block-to-block adjustment is not calculated or applied. As can be seen in FIG. 9, the 8-bit non-overlapping scan produces a row of digitized scan results 9010 that has an inconsistent amount of error throughout the row. Said another way, the digitized scan results 9010 are offset from the zero-offset reference 9005 by an amount that varies along the row.

FIGS. 10A-10E illustrate a nine-bit scan in accordance with embodiments discussed herein. The nine-bit scan shown in FIGS. 10A-10E includes a redundant sensing element in each block. For example, the first redundant sensing element corresponds to bit 8 of block 0 and to bit 0 of block 1. FIGS. 10A-10E show the successive sampling of blocks and the movement of the idealized sensor input due to the presence of the noise signal 7006 shown in FIG. 7. When the scan of block 0 occurs, the example input signal is in position 10005, offset by an amount that corresponds to level A. Similarly, when the scan of block 1 occurs (FIG. 10B), the example input signal is at position 10010, offset by an amount that corresponds to the B noise level. When the scan of block 2 occurs (FIG. 10O), the example input signal is at position 10015, offset by an amount that corresponds to the C noise level. When the scan of block 3 occurs (FIG. 10D), the example input signal is at position 10020, offset by an amount that corresponds to the D noise level. When the scan of block 4 occurs (FIG. 10E), the example input signal is at position 10025, offset by an amount that corresponds to the E noise level.

Figure 10A:
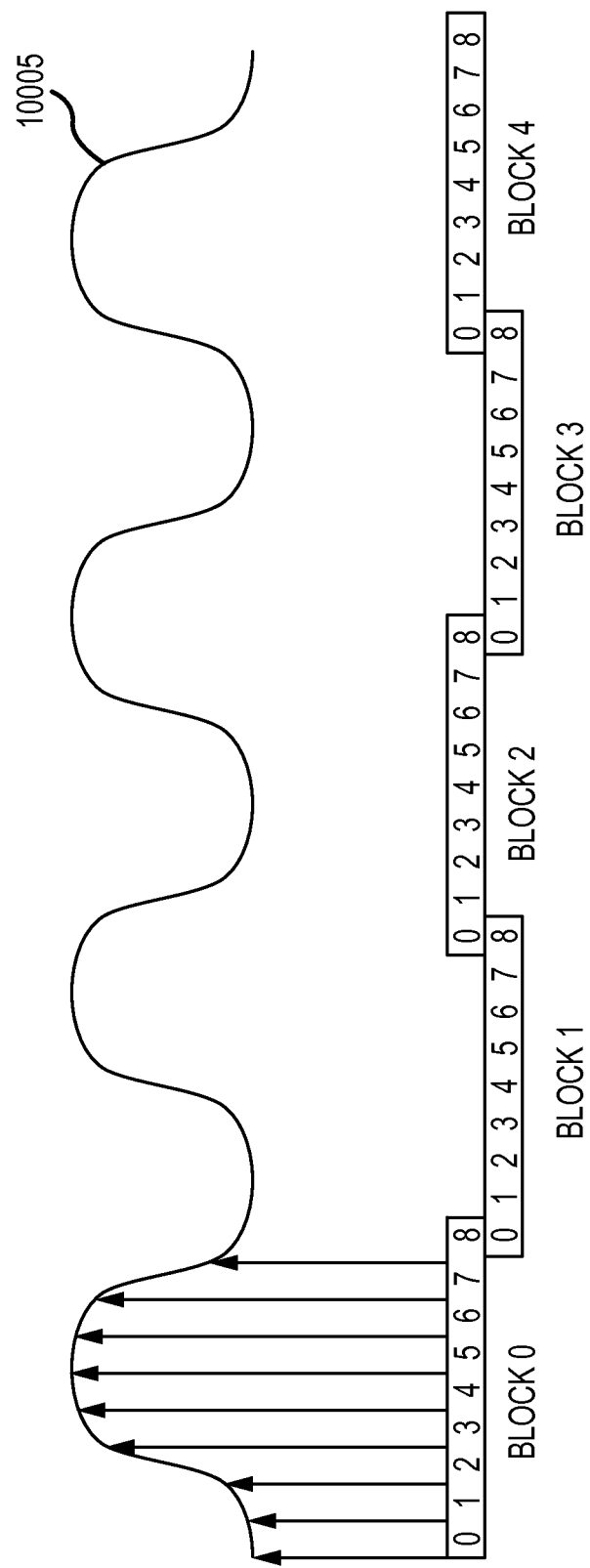
FIGS. 10A-10E are diagrams illustrating the first five block reads, in the presence of the noise pattern shown in FIG. 7, of an 9-bit overlapping scan in accordance with various embodiments.
Figure 10B:
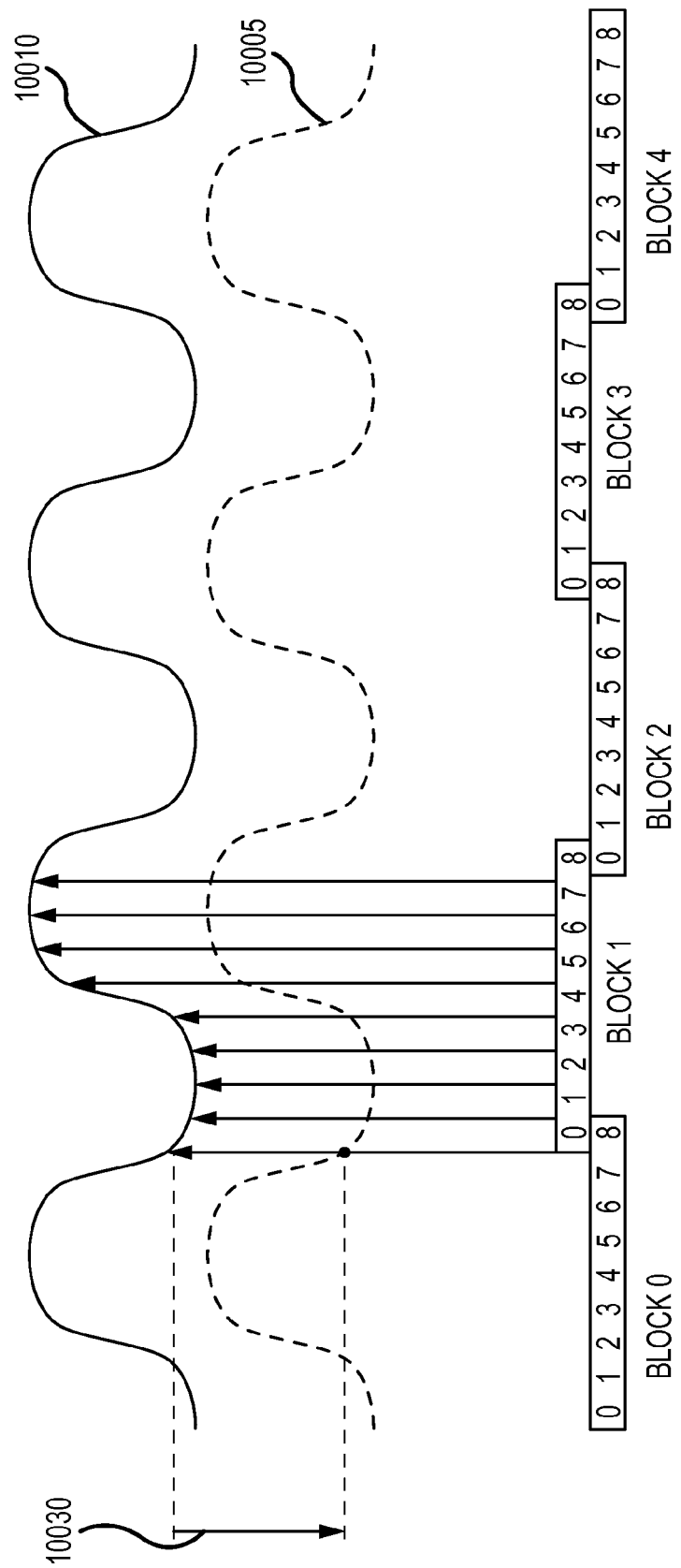
Figure 10C:
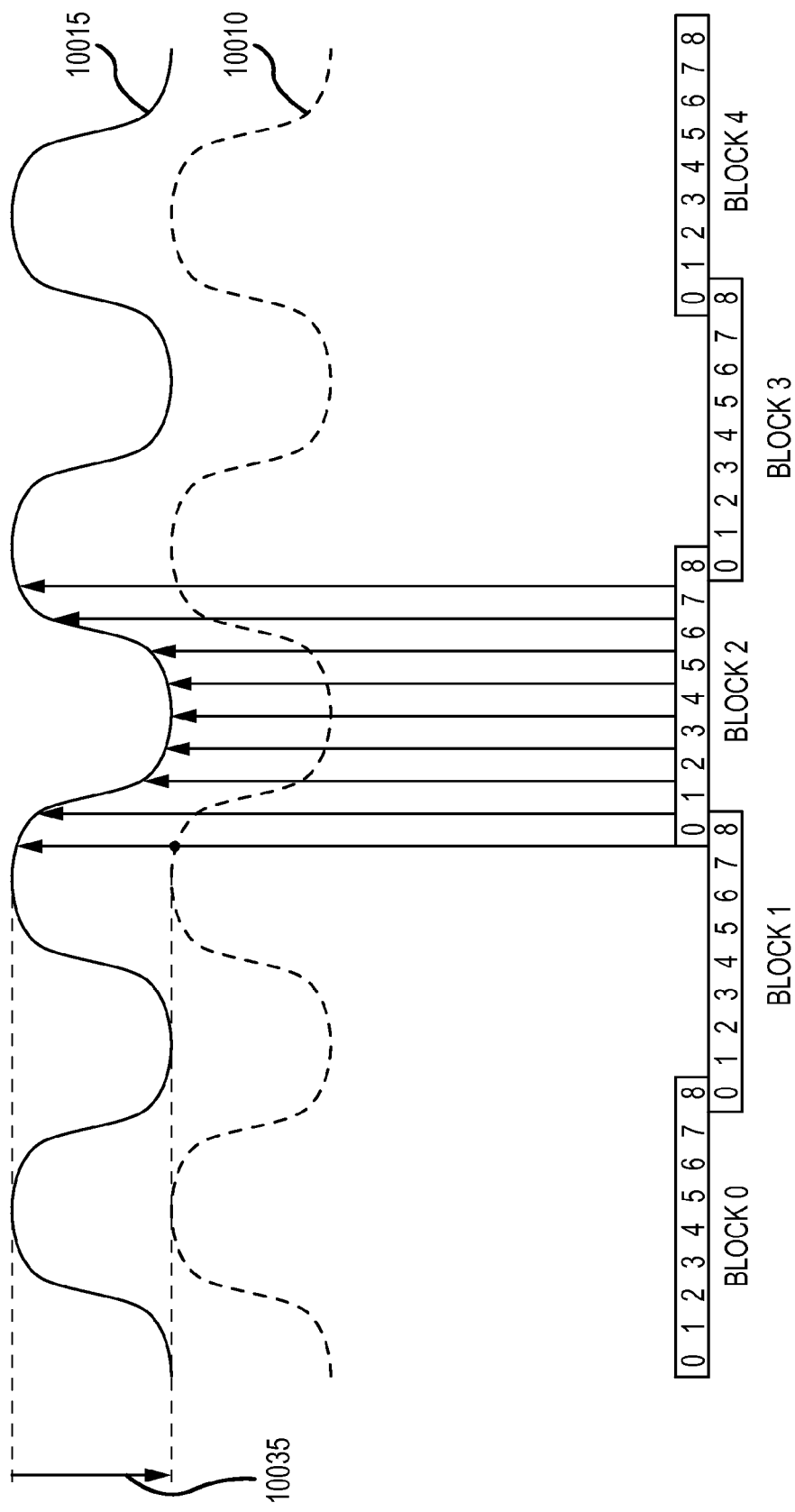

As time passes and the block reads occur, the noise pattern 7006 causes the example signal input pattern to move to different offset positions. FIG. 10B shows the prior position of the example signal input pattern 10005 when block 0 was scanned, as well as the current position of the example signal input pattern 10010 during the scan of block 1. Similarly, the FIGS. 10C-10E show the prior and current positions of the example signal input pattern as each individual block is scanned.

Figure 10D:
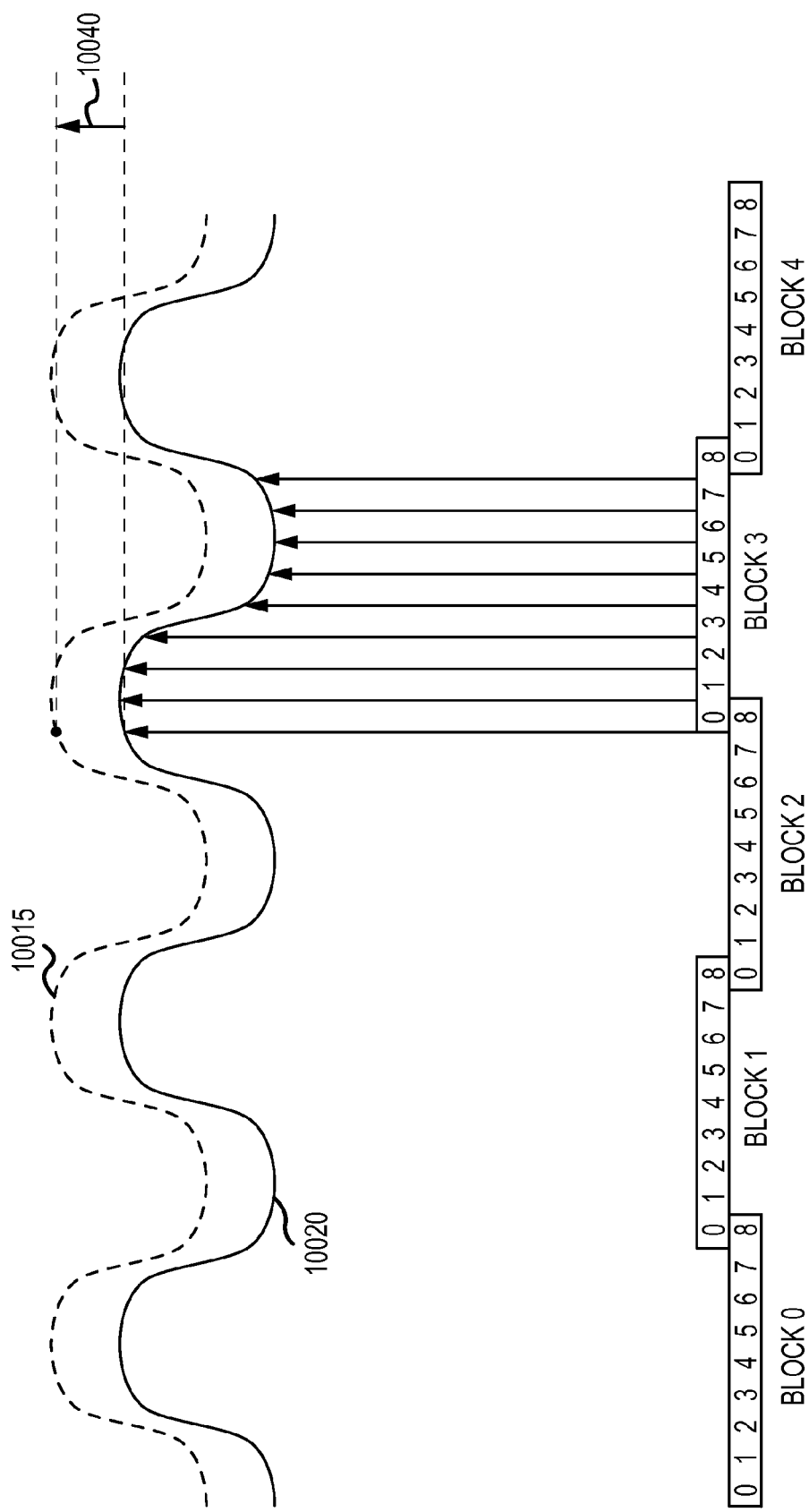
Figure 10E:
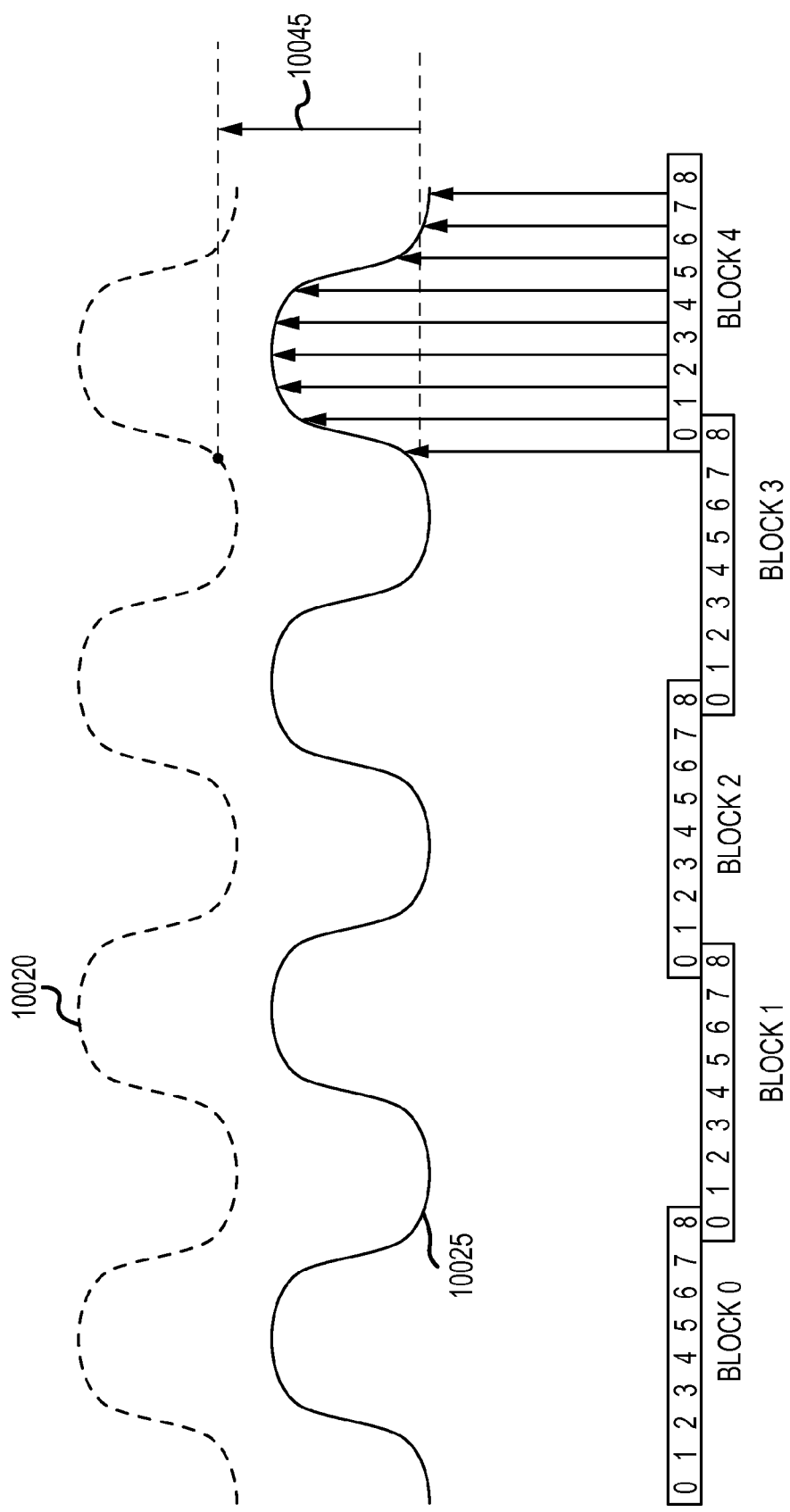

FIGS. 10B-10E additionally show the difference between the first and second samplings of a redundant sampling element. For example, FIG. 10B shows the difference 10030 between the last bit in block 0 and the first bit in the block 1. Similarly, FIG. 10O shows the difference 10035 between the last bit in block 1 and the first bit in the block 2. FIG. 10D shows the difference 10040 between the last bit in block 2 and the first bit in the block 3. FIG. 10E shows the difference 10045 between the last bit in block 3 and the first bit in the block 4.

Figure 11:
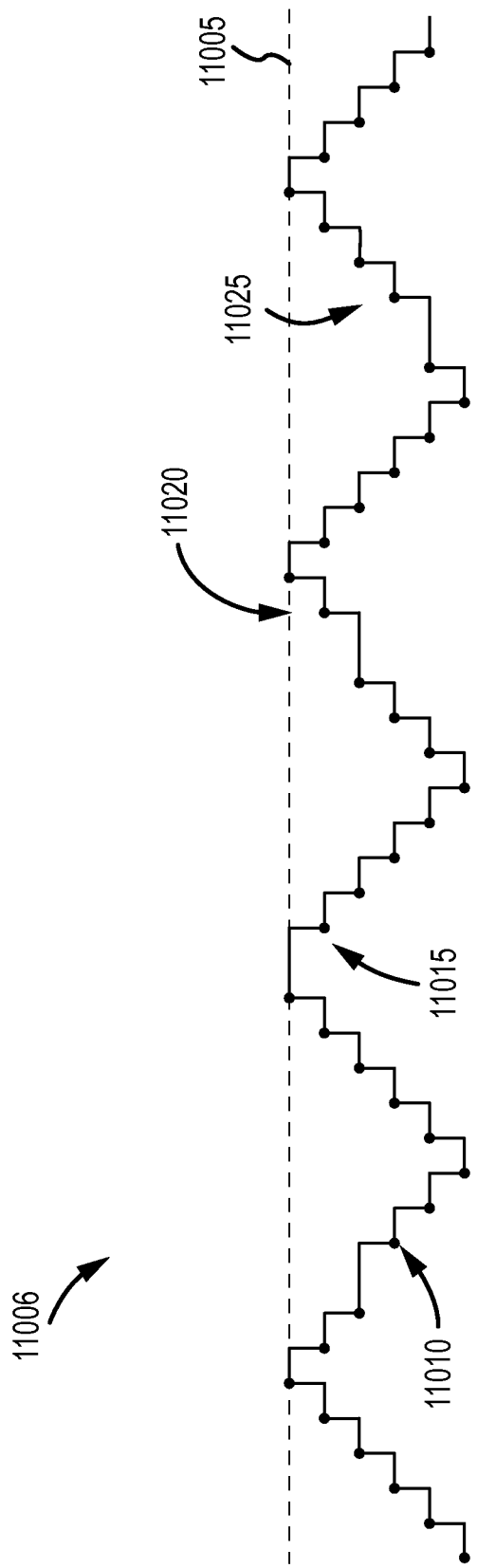
FIG. 11 is a diagram showing digitized scan results from the scan shown in FIGS. 8A-8E, including block-to-block adjustments in accordance with various embodiments.

FIG. 11 shows digitized scan results 11006 that are output from the sensor apparatus 3000 as it implements the nine-bit scan shown in FIGS. 10A-10E. Here, redundant sensing elements are sampled twice and a block-to-block adjustments are calculated and applied. Specifically, the difference 10030 is subtracted out of the block of digitized scan 11006 results that begins with bit 11010; the difference 10035 is subtracted out of the block of digitized scan 11006 results that begins with bit 11015; the difference 10040 is subtracted out of the block of digitized scan 11006 results that begins with bit 11020; and the difference 10045 is subtracted out of the block of digitized scan 11006 results that begins with bit 11025. As can be seen in FIG. 11, the 9-bit overlapping scan produces a row of digitized scan results 9010 that has a consistent amount of error throughout the row. Said another way, the digitized scan results 11006 are offset from the zero-offset reference 11005 by an amount that does not vary along the row.

Figure 12A:
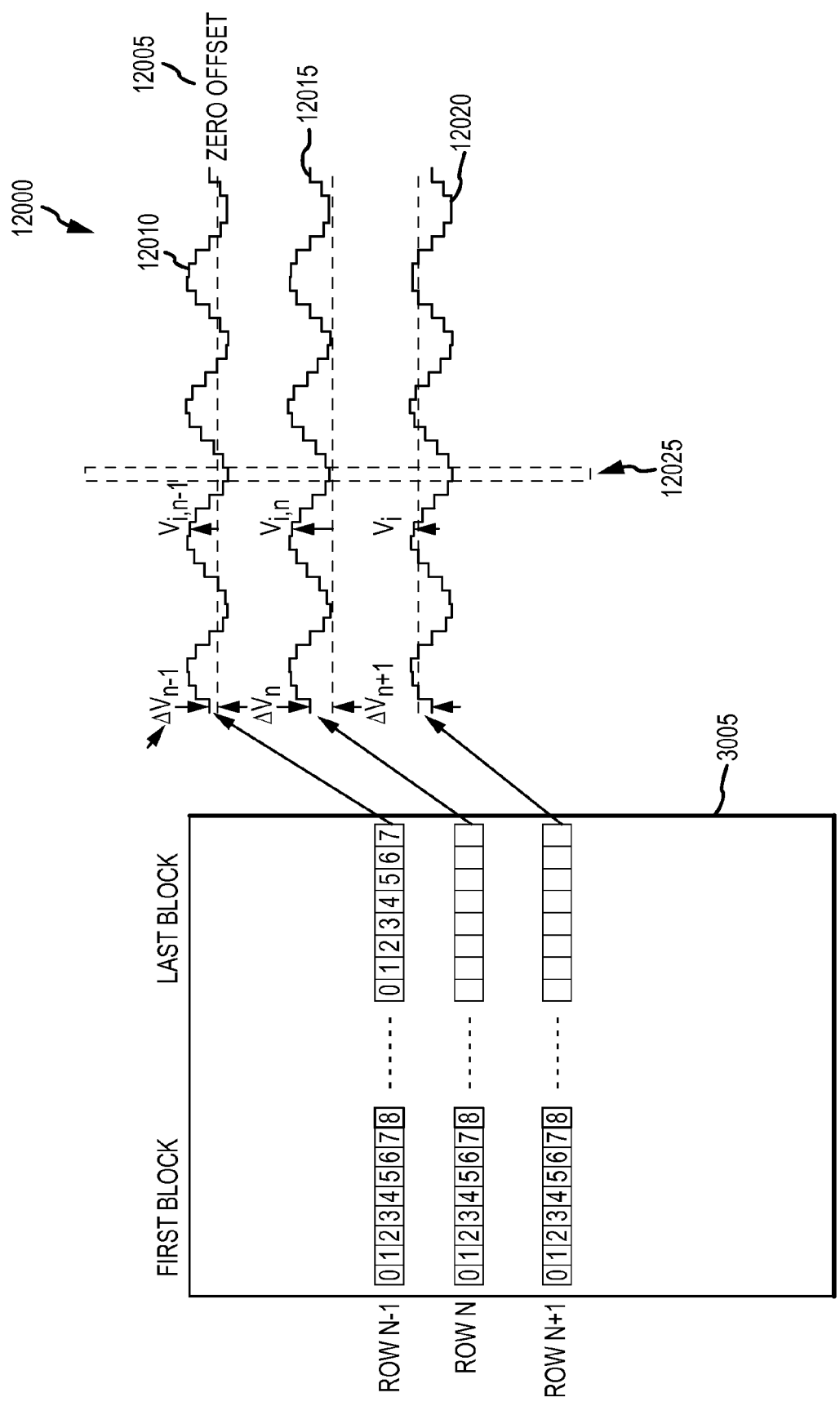
FIG. 12A is a diagram showing an example variation between row scans that can occur due to the presence of noise.

FIG. 12A is a diagram that illustrates example digitized scan results 12000 captured by the sensor apparatus 3000 shown in FIGS. 3A-3C. The digitized scan results 12000 are organized into rows and columns of data that correspond to the rows and columns of the sensor array. FIG. 12A is an illustration of the difference in noise levels between rows. By way of example, FIG. 12A includes three rows of data where each of the three rows has a different offset from the zero-offset level 12005. The digitized scan results 12000 can be thought of as an exemplary touch image captured by a sensor apparatus. More specifically, the scan results are those of the idealized input signal pattern shown in FIGS. 10A-10E. Block-to-block adjustments have been applied to each row of the digitized scan results 12000 to correct for noise variations occurring between scans of adjacent blocks. Thus, the amount of error in each row is approximately constant throughout the row. However, the amount of error varies from row to row. In the digitized scan results 12000, the differing amounts of error between rows appears as differing offsets from a zero offset reference, such as ground. In column 12025, for example, row 12010 has an offset of negative one unit from the zero offset reference; whereas row 12015 is offset by zero units and row 12020 is offset by negative three units.

The digitized scan results 12000 can be thought of a noisy version of a corrected image that has been adjusted to account for noise in the sensor. In the corrected image, image data values that correspond to the zero-offset reference can indicate that the corresponding sensing element in the sensing array registered that no object touched or hovered over the panel when the sensing element was sampled. Further, image data values that have a positive offset from the zero-offset level can indicate that the corresponding sensing element in the sensing array registered either that an object touched the panel or that an object hovered over the panel, depending on the proximity of the touching or hovering object. The magnitudes of the image values in the corrected image convey meaningful information about the type of touch input received at the touch panel. The meaning of the image value magnitudes might be obscured in the noisy image because the presence of noise introduces unwanted offsets into the image data values. Thus, in the noisy image, the image data indicative of an untouched area might, because of noise, have a negative value instead of a zero-offset value, and the image data indicative of a touched area might, because of noise, have either negative or positive values, depending on the proximity of the touching or hovering object and the amount of noise. Thus, in the noisy image, the sensor data having the lowest value, such as the sensor data in column 12025, may be assumed to represent "untouched data." Touched locations may be assumed to have values greater than the lowest value.

Embodiments discussed herein are directed to constructing a corrected image from a noisy image in a touch sensitive device. A derivation method can include aligning rows of the noisy touch image relative to each other based on image data indicative of no touch or hover ("untouched data").

Untouched data can more clearly show how much row alignment is needed compared to image data indicative of a touch or hover ("touched data"). The method can further include aligning the image to a baseline value based on the untouched data in order to add DC information so that the image is properly aligned with the zero-offset reference. The untouched data can more clearly show how much baseline alignment is needed compared to the touched data. In one example, the construction can be performed using the digitized scan results alone. In another example, the construction can be performed using the digitized scan results and common mode data indicative of the missing image row average. The ability to use the digitized scan results to construct a corrected touch image can advantageously provide the benefits of the corrected image while performing device functions with the constructed image.

In the following description of example embodiments, reference is made to the accompanying drawings in which it is shown by way of illustration specific embodiments that can be practiced. It is to be understood that other embodiments can be used and structural changes can be made without departing from the scope of the various embodiments. Although construction from offsets based on DC balancing is described herein, it should be understood that construction based on any image offsets can be performed according to various embodiments.

Each row of image data in the digitized scan results can be adjusted to have an average value of zero, with untouched data being negative and touched data being either negative or positive depending on the object's proximity, thereby rendering the sum of the row to equal zero. Due to differing touch levels (as well as noise and other effects), each row of image data can have different average values. These differences can be most apparent in the untouched data, where negative values for different rows might differ due to noise. To correct these differences, the rows can be aligned relative to each other using the untouched data as a guide. Methods for performing the row alignment will be described in detail below.

Figure 12B:
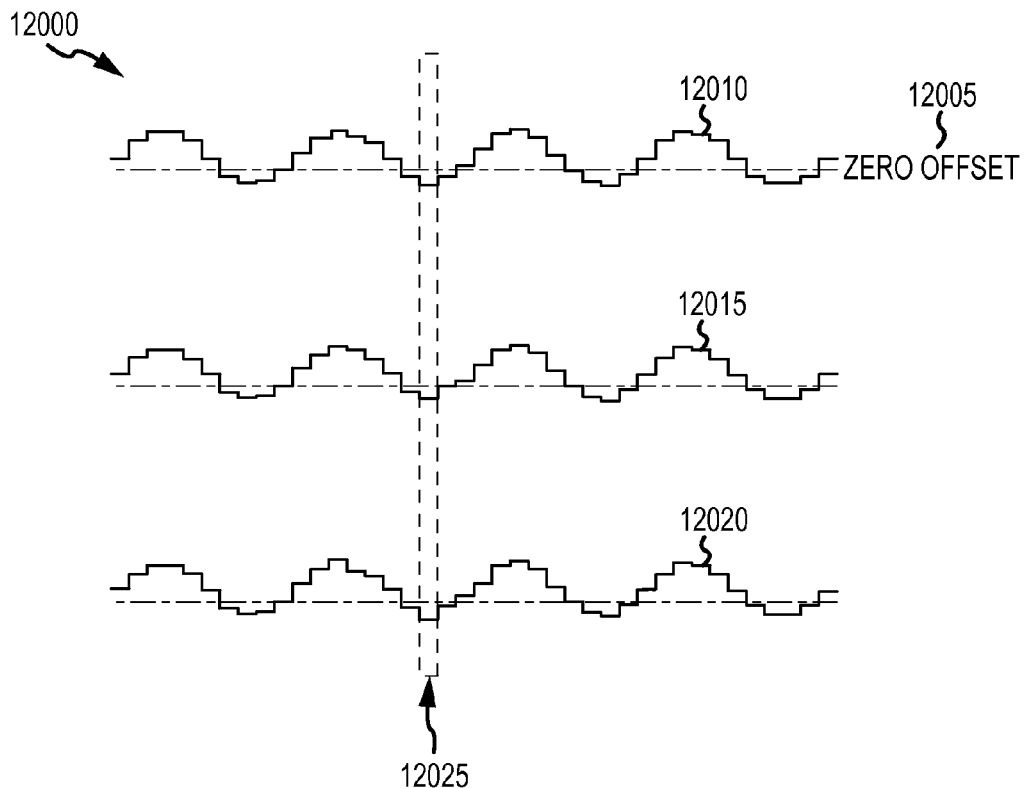
FIG. 12B is a diagram showing the sensor data from FIG. 12A after a row-to-row adjustment is applied.

FIG. 12B illustrates an example of row alignment in the digitized scan results 12000 of FIG. 12A. In the example of FIG. 12A, an exemplary column (labeled 12025 in FIG. 12A) of untouched data is shown for a noisy touch image. Prior to row alignment, column 12025 shows erroneous differences between the untouched data values between different rows in the image. After row alignment, column 12025 shows the untouched data values as having the same offset for all rows. The data values for the touched data in each row can be adjusted according to the adjustments made to their corresponding untouched data.

Referring again to FIG. 12B, after the rows have been aligned, the image data still lacks the DC information. This can be most apparent in the row-aligned untouched data, where the data value including the DC information should be approximately zero, not negative. To add the DC information, the image can be aligned relative to a baseline value B, representative of the DC information, using the row-aligned untouched data as a guide. Methods for performing the baseline alignment will be described in detail below.

Figure 12C:
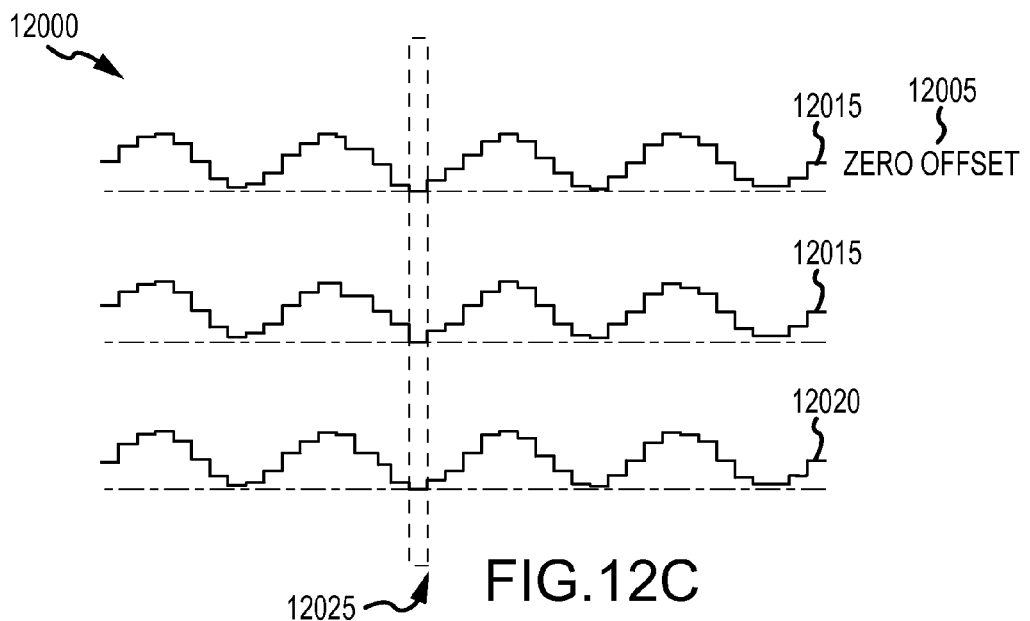
FIG. 12C is a diagram showing the sensor data from FIG. 12B after DC information is added.

FIG. 12C illustrates an example of baseline alignment in the row-aligned column of FIG. 12B. In the example of FIG. 12C, an exemplary column 12025 of row-aligned untouched data from FIG. 12B is shown. Prior to baseline alignment, the column shows untouched data with a negative offset. After baseline alignment, the column shows the image data having a data value corresponding to the baseline value. In one embodiment, the baseline value is zero. The data values for the touched data in each row (not shown) can be adjusted according to the adjustments made to their corresponding untouched data, resulting in all positive values for the touched data.

Constructing a corrected touch image from a noisy touch image can be formulated as follows. Aligning the rows of a noisy touch image with each other can be formulated as selecting a set of relative row offsets which minimize the column edge energy, where each edge has a weight vector associated with it. The weights can be chosen so as to weight the untouched data heavily. This is because the required row alignments can be more apparent in the untouched data, as described previously. Aligning the image to a baseline value can be formulated as finding an overall offset of the image which minimizes the total image energy using the edge weights. FIGS. 13 through 17 illustrate exemplary methods for performing the row and baseline alignments according to these formulations as will be described in detail below.

Figure 13:
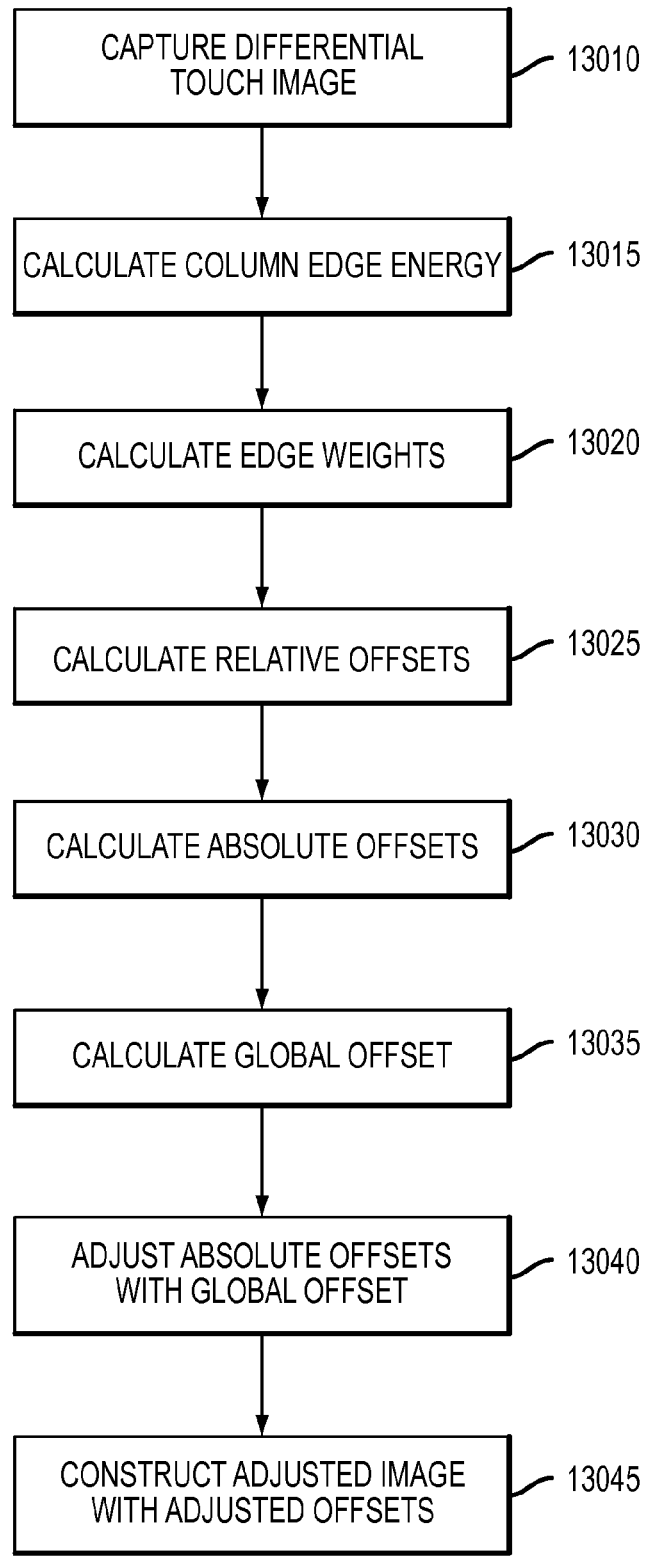
FIG. 13 is a flow chart that illustrates an exemplary method for constructing an corrected touch image from a noisy touch image based on image data according to various embodiments.

FIG. 13 illustrates an exemplary method for constructing an corrected touch image from a noisy touch image using the digitized scan results. In the example of FIG. 13, a noisy touch image can be captured during a scan of a touch panel (13010). Consider a 3×3 noisy touch image C as follows.

$$C = \begin{bmatrix} C_{11} & C_{21} & C_{31} \\ C_{12} & C_{22} & C_{32} \\ C_{13} & C_{23} & C_{33} \end{bmatrix} \quad (1)$$

where $C_{ij}$=image data value, i=column, and j=row. For example, for 3×3 image C, $C_{23}$=the image data value for column 2 and row 3.

Column edge energy can be calculated from the image C and formed in a matrix E as follows (13015).

$$E = \begin{bmatrix} E_{11} & E_{12} & E_{13} \\ E_{21} & E_{22} & E_{23} \\ E_{31} & E_{32} & E_{33} \end{bmatrix}, \quad (2)$$

where $E_{ij}$=column edge energy value defined as $(C_{ij}-C_{i,j+1})$. The first and last rows of the image C can be connected to treat the image as a cylinder for calculation purposes. For example, for 3×3 matrix E, $$E_{11}=(C_{11}-C_{12}) \quad (3)$$

$$E_{12}=(C_{12}-C_{13}) \quad (4)$$

$$E_{13}=(C_{13}-C_{11}) \quad (5)$$

Weights associated with each edge can be calculated and formed in a matrix W as follows (13020).

$$W = \begin{bmatrix} W_{11} & W_{12} & W_{13} \\ W_{21} & W_{22} & W_{23} \\ W_{31} & W_{32} & W_{33} \end{bmatrix}, \quad (6)$$

where $W_{ij}$=edge weight for $E_{ij}$. For example, $W_{23}$=edge weight for $E_{23}$.

The success of the row and baseline alignment can depend to some extent on choosing the appropriate edge weights. Ideally, the weights can be chosen based on the probability of the image data making up that edge being untouched data. A variety of weight calculations can be selected from. In one embodiment, $$W_{ij}=[100-(C_{ij}-\text{MIN}_j)], \qquad (7)$$

where $\text{MIN}_j$=minimum data value of image row j.

In another embodiment, $$W_{ij}=[100-\text{abs}(C_{ij}-\text{MED}_j)], \qquad (8)$$

where $\text{MED}_j$=median of the negative data values of image row j. Here, only the negative data values are considered because the median of the negative values can be a more robust estimator of the current baseline value of the noisy touch image. The estimated baseline value of the differential image can then be indicative of the baseline alignment to be done to construct the original image.

In still another embodiment, $$W_{ij}=\max[(W_{max}-\text{abs}(C_{ij}-\text{MED}_j)),W_{min}], \qquad (9)$$

where $W_{min}$, $W_{max}$=minimum and maximum edge weights, respectively. These weights can be set according to design or operational parameters of the device. For example, in some embodiments, $W_{min}=\frac{1}{5}$, $W_{max}=75$.

In other embodiments, mode can be used instead of median, $$W_{ij}=[100-\text{abs}(C_{ij}-\text{MOD}_j)] \qquad (10)$$

$$W_{ij}=\max[(W_{max}-\text{abs}(C_{ij}-\text{MOD}_j)),W_{min}], \qquad (11)$$

where $\text{MOD}_j$=modal of the negative data value of image row j.

In other embodiments, a mean or a weighted mean of the negative data values of each image row j can be used rather than minimum, median, or mode to calculate weights, similar to Equations (7)-(11). Any other suitable image data parameters can be used according to various embodiments.

In other embodiments, any of the above weighting schemes can be used for an initial weighting. This initial weighting can then be modified to account for the presence of other non-touch/non-baseline effects, such as the negative sense element effect. One such weighting can including calculating the affected image data $N_{ij}$ as follows. $N_{ij}=1$, if there exists at least one image data value in image column i and image row j that is greater than zero. $N_{ij}=0$, otherwise. Accordingly, $$W_{ij,a}=W_{ij}-W_{ij}\cdot N_{ij}\cdot k, \qquad (12)$$

where k=an attenuation factor. In some embodiments, k=0.5. Here, weights $W_{ij}$ for negative pixel influenced image data can be attenuated to produce attenuated weights $W_{ij,a}$.

In the above embodiments, the edge weights can be the minimum of two weights. In other embodiments, the maximum of the two weights and their arithmetic and geometric mean can be considered.

Also, in the above embodiments, the edge weights can be determined for the general case. In other embodiments, the edge weights can be determined based on variance in the untouched data of each row. To do this, the mode of each row can be calculated and the number of occurrences of the mode determined. If the mode is sufficiently strong, i.e., the number of occurrences high, a smaller maximum edge weight and the modal formulation (Equations (10), (11)) can be used. As the mode weakens, i.e., the number of occurrences decreases, the variance can increase. If the mode is sufficiently weak, i.e., the number of occurrences is low enough, a larger edge weight can be used with the median formulation (Equations (8), (9)). This can allow the weight calculation to better reflect the available data.

Relative row offsets R, i.e., the amount of row alignment to be done for each row relative to an adjacent row, can be calculated as follows (13025). First, the following mean square error for R can be minimized, $$\Sigma_{ij}W_{ij}(E_{ij}+R_j)^2, \qquad (13)$$

where $R_j$=relative offset for image row j.

The relationship between the relative row offsets R and absolute row offsets A, i.e., the absolute amount of row alignment to be done for each row, as illustrated in Equation (17), can be formulated as follows.

$$R_j=A_j-A_{j-1}, \qquad (14)$$

where $A_j$=absolute offset for image row j. The first and last rows of the differential image C can be connected to treat the image as a cylinder for calculation purposes. For example, for 3×3 image C, $R_1=A_1-A_3$.

The partial derivatives of $R_j$ can be set to zero, $$\partial R_j=2\Sigma_i W_{ij}(E_{ij}+R_j)=0. \qquad (15)$$

$R_j$ can be found, $$R_j=\frac{\sum_i W_{ij}E_{ij}}{\sum_i W_{ij}}. \qquad (16)$$

Absolute row offsets A can be calculated based on the relative offsets R as follows (13030).

$$M_{ij}A_j=R_j, \qquad (17)$$

$$M=\begin{matrix} 1 & -1 & 0 \\ 0 & 1 & -1 \\ -1 & 0 & 1 \end{matrix}. \qquad (18)$$

Equation (18) can have multiple solutions, such that there is no true inverse of matrix M. Accordingly, a pseudo-inverse matrix P can be generated and applied as follows to get the absolute row offsets $A_j$ for each row.

$$A_j=P_{ij}R_j, \qquad (19)$$

where $P_{ij}$=pseudo-inverse value of corresponding $M_{ij}$ value.

Next, a global offset $A_g$ can be calculated for the baseline alignment (13035). The global offset $A_g$ can be calculated based on image data at the borders of the image, because the border data can be assumed to be untouched data, as follows.

$$A_g=\frac{\sum_{border} W_{ij}(C_{ij}+A_j)}{\sum_{border} W_{ij}}. \qquad (20)$$

The global offset $A_g$ can also be formulated as a sum over the entire touch image, not just the border data.

The absolute row offsets $A_j$ can be adjusted based on the global offset as follows (13040).

$$A_{j,f}=A_j+A_g, \qquad (21)$$

where $A_{j,f}$=adjusted absolute offset for image row j.

The adjusted absolute offsets $A_{j,f}$ can be applied to the noisy touch image C as follows (13045).

$$I_{ij}=C_{ij}+A_{j,f}, \qquad (22)$$

where $I_{ij}$=constructed corrected touch image data from noisy touch image data $C_{ij}$.

Applying the offsets $A_{j,f}$ can align the rows of the image C relative to each other and the image to the baseline, thereby constructing an corrected touch image I from the noisy touch image C.

Although the example refers to 3×3 matrices, it is to be understood that the method applies to any suitable matrix sizes according to various embodiments.

An inverted baseline can occur when a touching or hovering object is present at the time that a baseline value for the touch panel is established. This can be problematic in a noisy touch image because the inherent DC balancing of the image data can make the inverted case look like an intended actual touch or hover and because the current baseline value is estimated based on the median of the negative touch values (as described previously). For example, a noisy touch image with a single inverted touch or hover can appear as two touching or hovering objects in the constructed corrected touch image.

Figure 14A:
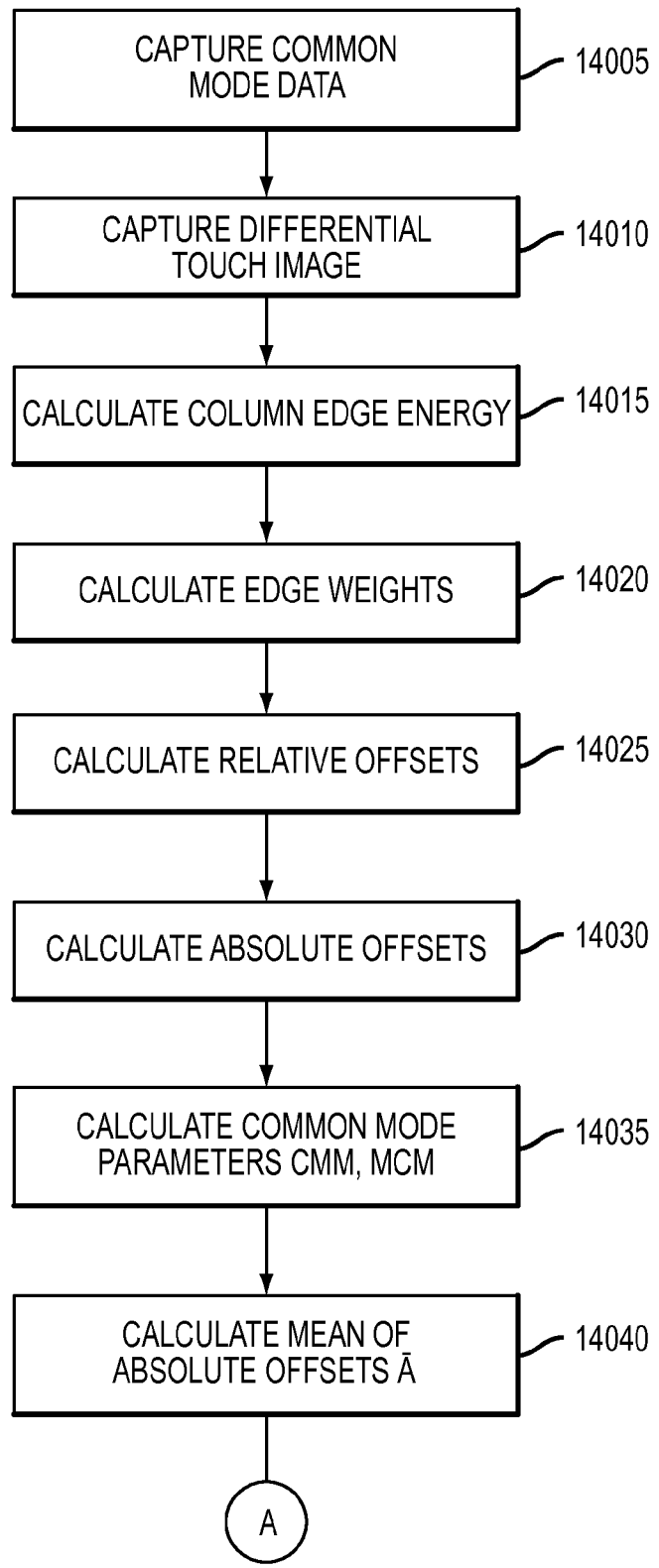
FIGS. 14A-14B are flow charts that illustrate an exemplary method for detecting baseline inversion in a noisy touch image according to various embodiments.
Figure 14B:
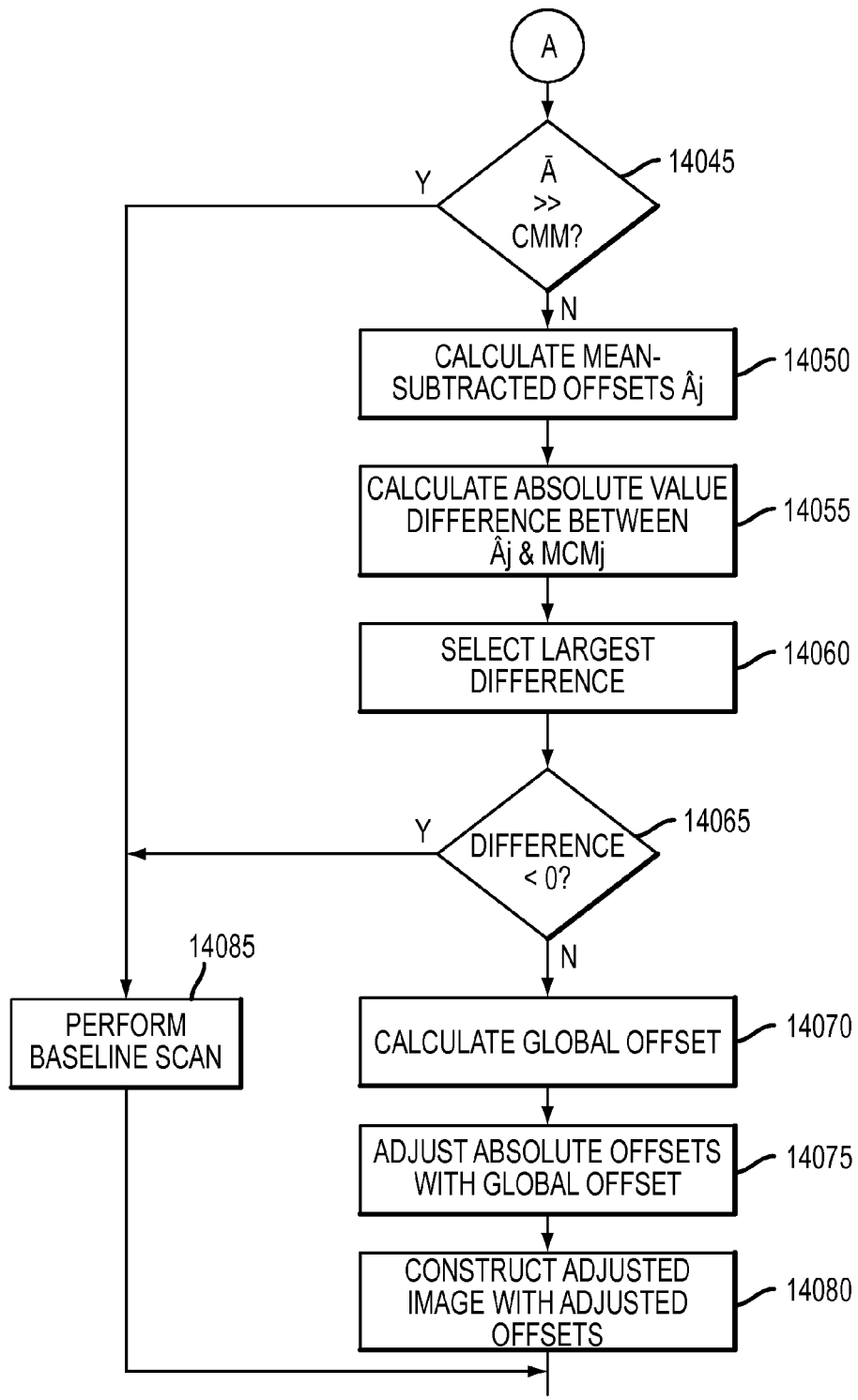

FIGS. 14A and 14B illustrate an exemplary method for detecting these inversions in the method of FIG. 13. In the example of FIGS. 14A and 14B, common mode data can be captured at the touch panel (14005). Common mode data can refer to data output from a touch panel when the columns in the panel are driven simultaneously, for example. In other words, common mode data can be the average values for the image rows. Note that the common mode data need not be accurate, i.e., need not have low noise and/or variance. Common mode data can be captured during a separate scan period than the noisy touch image scan period. In some embodiments, multiple scans can be performed to capture common mode data for each row and the captured data averaged to provide an average common mode value for each row.

The method of FIGS. 14A and 14B can then proceed in a similar manner as the method of FIG. 13 (blocks 13010-13030) to capture a noisy touch image C (14010), calculate column edge energy E (14015), calculate edge weights W (14020), calculate relative row offsets R (14025), and calculate absolute row offsets A (14030).

After calculating the offsets A (14030), common mode parameters can be calculated based on the captured common mode data as follows (14035). The common mode mean CMM is $$CMM = \frac{\sum_j CM_j}{n_{cols}}, \quad (23)$$

where $CM_j$=common mode data, and $n_{cols}$=number of rows j in the image. The mean-subtracted common mode MCM is $$MCM_j = CM_j - CMM. \quad (23)$$

The mean $\overline{A}$ of the absolute row offsets A can be calculated as follows (14040). The offsets A can effectively be an estimate of the common mode data.

$$\overline{A} = \frac{\sum_j A_j}{n_{cols}}. \quad (25)$$

A first inversion detection test can be performed, in which a comparison can be made between the offset mean and the common mode mean (14045). If the common mode mean CMM is substantially smaller than the offset mean $\overline{A}$, a large-scale inversion is likely present. A panel scan can be performed to capture another baseline (14085) and the construction can be stopped for this image. If a large-scale inversion is not detected, a second inversion detection test can be performed to look for a smaller scale inversion as described below.

First, the mean-subtracted row offsets for each row $\hat{A}_j$ can be calculated as follows (14050).

$$\hat{A}_j = A_j - \overline{A}. \quad (26)$$

The second inversion detection test can compare the mean-subtracted row offsets $\hat{A}_j$ to the mean-subtracted common mode values $MCM_j$ for each row (14055). The row with the largest absolute value between the two can be selected (14060). For that row, if the signed difference is substantially negative, an inversion is likely present. A panel scan can be performed to capture another baseline (14085) and the construction can be stopped for this image. If a smaller scale inversion is not detected, the image data can be deemed inversion-free.

The method can then perform in a similar manner as FIG. 13 (blocks 13035-13045) for the inversion-free data to calculate a global offset $A_g$ (14070), adjust the absolute row offsets A with the global offset $A_g$ (14075), and apply the adjusted offset $A_{j,f}$ to the noisy touch image C to construct an corrected touch image I (14080).

Figure 15A:
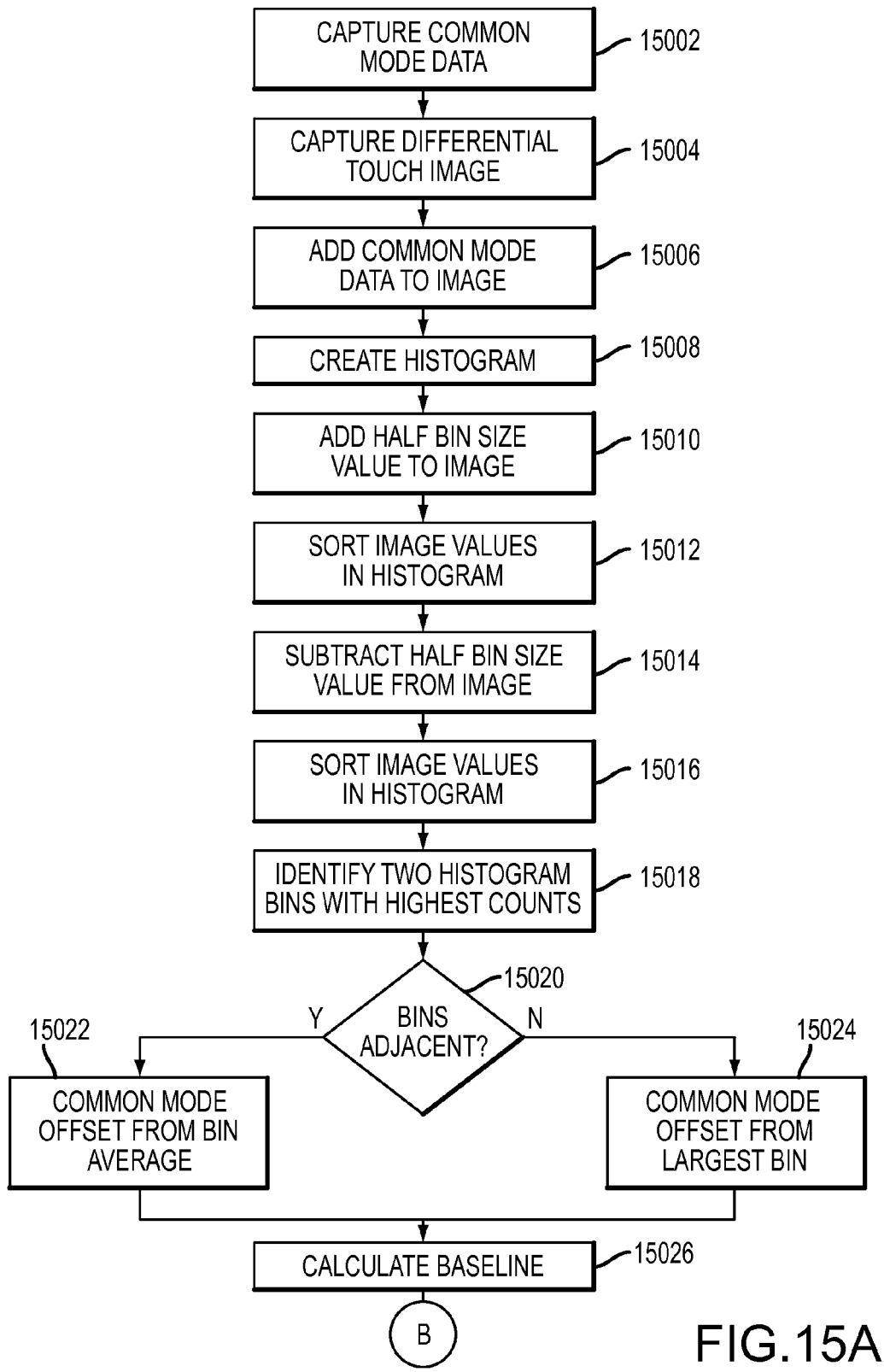
FIGS. 15A-15B are flow charts that illustrate an exemplary method for constructing an corrected touch image from a noisy touch image based on image data and common mode data according to various embodiments.
Figure 15B:
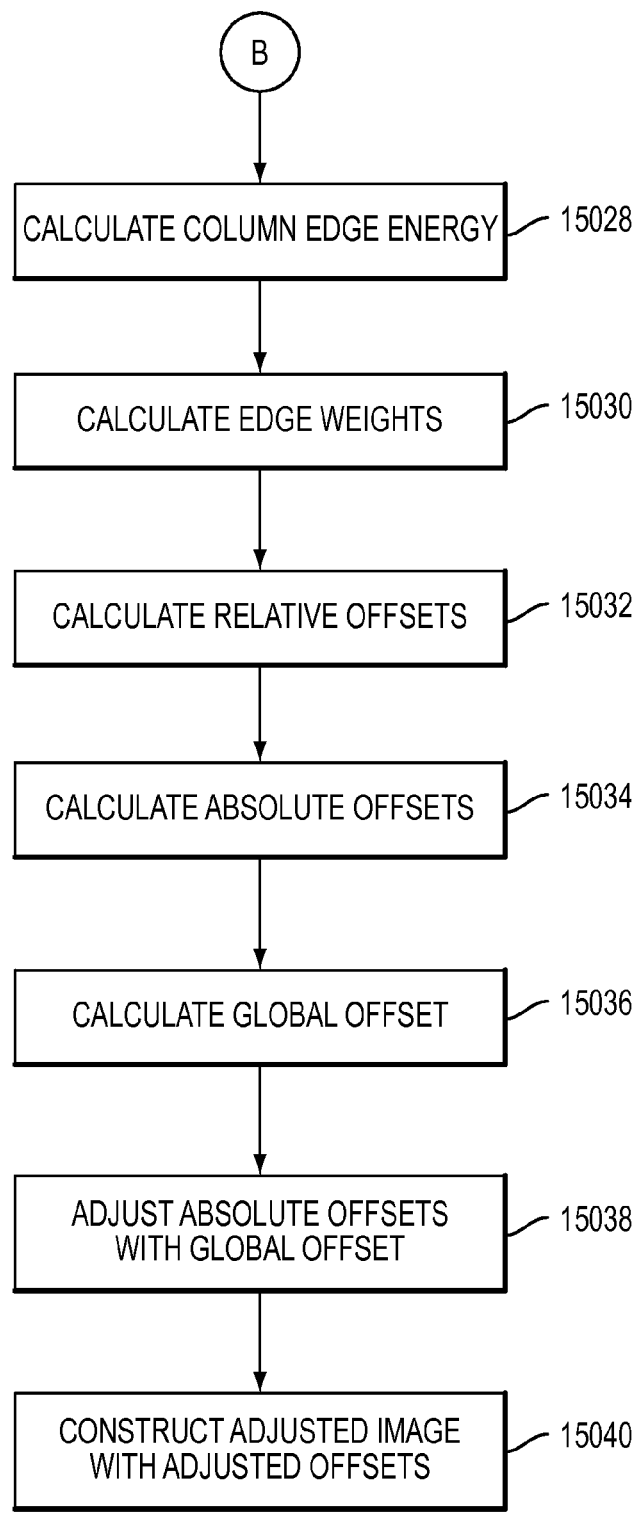

FIGS. 15A and 15B illustrate an exemplary method for constructing an corrected touch image from a noisy touch image using digitized scan results and common mode data. The method of FIGS. 15A and 15B is similar to the method of FIG. 13 with the addition of the use of common mode data to estimate the baseline value of an image row (rather than using a median of the negative touch values), thereby bypassing the inversion detection method of FIGS. 14A and 14B.

In the example of FIGS. 15A and 15B, common mode data CM can be captured at a touch panel in a similar manner as described in FIG. 14 (15002). A noisy touch image C can be captured at the touch panel in a similar manner as described in FIG. 13 (15004). The common mode data CM can be added to the captured image touch data C to create new image C' as follows (15006).

$$C'_{ij} = C_{ij} + CM_j. \quad (27)$$

The common mode data can include substantial noise in some instances, which can lead to significant variations between successive captured images. To reduce the noise effects, a histogram approach can be used to estimate a common mode mean offset $CM_o$ as follows, under the assumption that most of the image data is untouched data, e.g., data indicative of no touching or hovering object. First, histogram bins over the range of data values in image C' can be generated for a desired bin size (15008). For example, in some embodiments, the bin size can be 16. For each data value in image C' that falls into a given bin, that bin's count can be incremented by 2.

Half of the bin size can be added to the image C' to produce image $C^{(2)}$ (15010). For example, in some embodiments, for a bin size of 16, a value of 8 can be added to each data value $C'_{ij}$ in the image C'. For each new data value (increased by half the bin size) in image $C^{(2)}$ that falls into a given bin of the histogram, that bin's count can be incremented by 1 (15012). Half the bin size can then be subtracted from the image C' to produce image $C^{(3)}$ (15014). For example, in some embodiments, for a bin size of 16, a value of 8 can be subtracted from each data value $C'_{ij}$ in the image C'. For each new data value (decreased by half the bin size) in image $C^{(3)}$ that falls into a given bin of the histogram, that bin's count can be incremented by 1 (15016).

The histogram bins with the highest and second highest counts can be identified (15018). If the identified bins are adjacent (15020), the common mode mean offset $CM_o$ can be the weighted average of the center values for the two bins (15022). If not, the common mode mean offset $CM_o$ can be the center value of the identified highest-count bin. (15024). The offsets $CM_o$ can be subtracted from the common mode values $CM_o$ as follows (15026).

$$BASE_j = CM_j - CM_o. \quad (28)$$

These resulting values $BASE_j$ can be estimates of the baseline values for the image rows.

Next, the method of FIGS. 15A and 15B can perform in a similar manner as the method of FIG. 13 (blocks 13015-13045). Column edge energy can be calculated (15028). Edge weights W can be calculated using $BASE_j$ as follows.

$$W_{ij} = [100 - abs(C_{ij} - BASE_j)]. \quad (29)$$

Equation (29) is similar to Equation (8) with $BASE_j$ replacing $MED_j$. Relative row offsets R can be calculated (15032). Absolute row offsets A can be calculated (15034). A global offset $A_g$ can be calculated (15036). The absolute row offsets A can be adjusted with the global offset $A_g$ (15038). The adjusted offsets $A_{j,f}$ can be applied to the noisy touch image C to construct an corrected touch image I (15040).

Figure 16A:
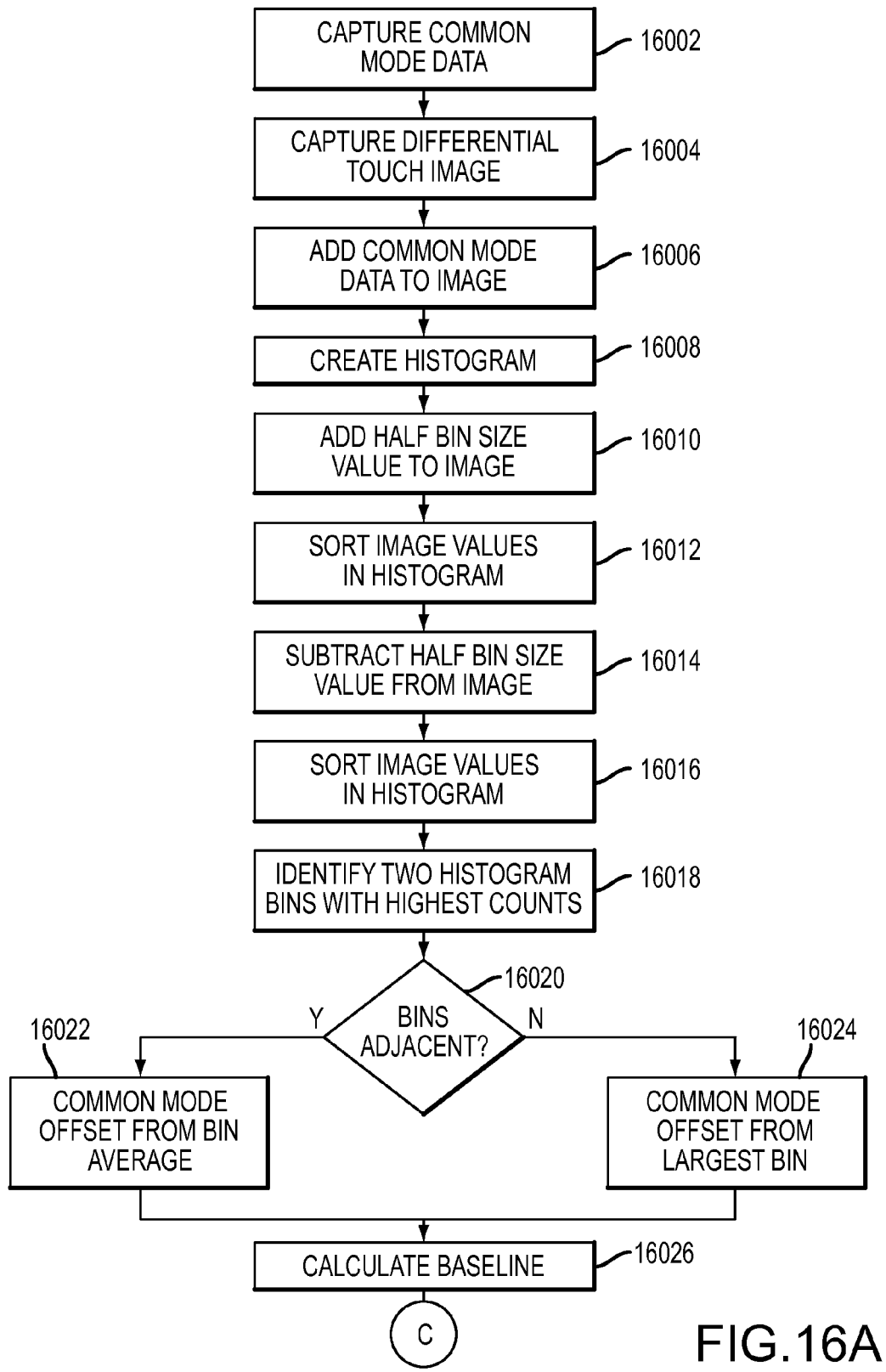
FIGS. 16A-16B are flow charts that illustrate another exemplary method for constructing an corrected touch image from a noisy touch image based on image data and common mode data according to various embodiments.
Figure 16B:
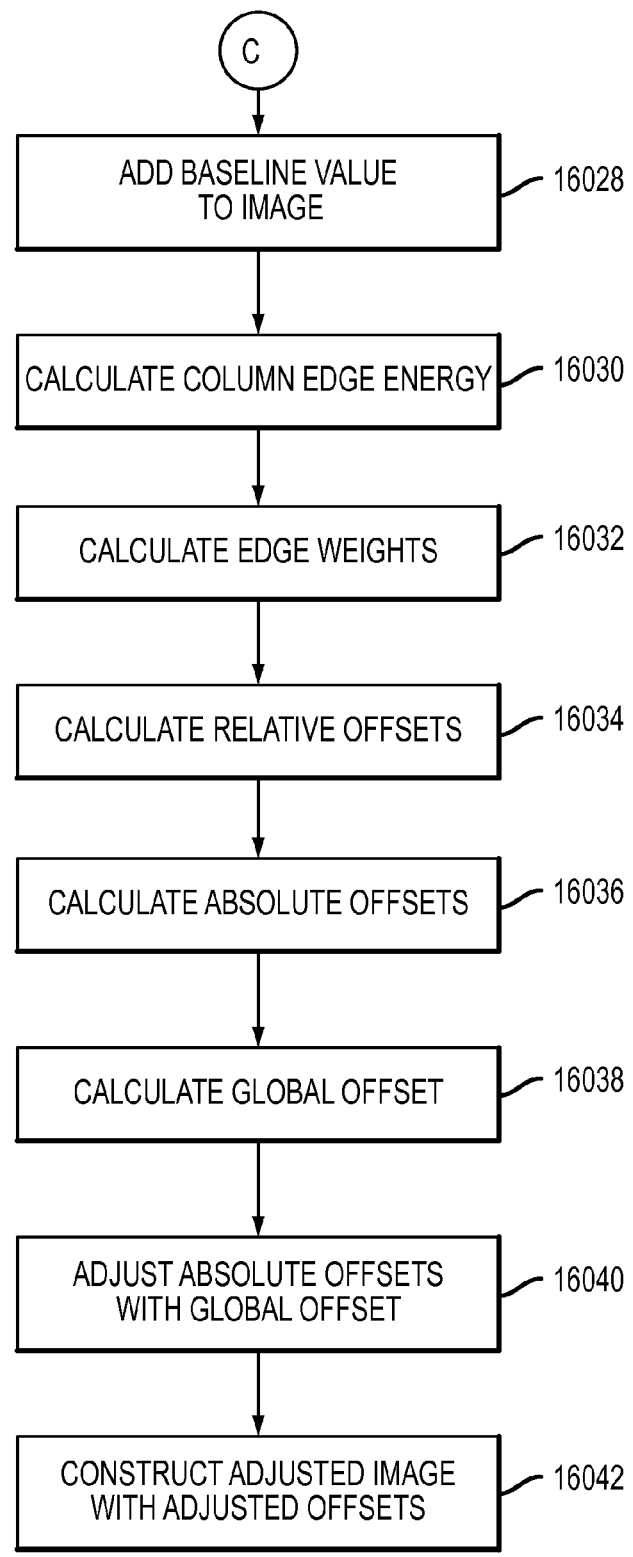

FIGS. 16A and 16B illustrate another exemplary method for constructing an corrected touch image from a noisy touch image using digitized scan results and common mode data. The method of FIGS. 16A and 16B is similar to the method of FIGS. 15A and 15B with the differences noted below. In the example of FIGS. 16A and 16B (similar to FIGS. 15A and 15B in blocks 15002-15026), common mode data can be captured (16002), a noisy touch image C captured (16004), the common mode data CM added to the captured image C (16006), and the histogram approach applied (16008-16026).

Common mode errors, such as noise and other errors, can directly couple into the constructed corrected touch image. To minimize these effects, common mode data can be limited to being used to directly construct the corrected touch image only when there is no other source of information about the magnitudes of the differential image rows. The sum of the edge weights along a given edge, e.g., $W_{11}$, $W_{21}$, $W_{31}$, etc., formed by image rows 1 and 2, can be indicative of the amount of magnitude information available for performing row alignment. This knowledge can be integrated into the method as follows.

After using the histogram approach to calculate $BASE_j$, estimates of the baseline values for the image rows (16026), $BASE_j$ can be added to the noisy touch image C to form image C' as follows (16028).

$$C'_{ij} = C_{ij} + BASE_j. \quad (30)$$

The column edge energy can be calculated for image C' (16030) in a similar manner as the method of FIGS. 15A and 15B (block 15028). Edge weights W can be calculated as follows.

$$W_{ij} = \max[(W_{max} - abs(C_{ij})), W_{min}]. \quad (31)$$

If common mode data is trustworthy, a penalty term can be applied for deviating from direct construction, i.e., adding the common mode data to the digitized scan results to directly to construct the corrected touch image, making the mean square error for $R_j$, $$\Sigma_{ij} W_{ij}(E_{ij} + R_j)^2 + \gamma R_j^2, \quad (32)$$

where $\gamma$ = a penalty factor. In general, $\gamma$ can be inversely proportional to common mode noise. For example, in some embodiment, $\gamma$=1.0. If a differential image row includes mostly touched data, i.e., data that indicates a touching or hovering object, the method can weigh more heavily toward direct construction because of the limited amount of untouched data, i.e., data that does not indicate a touching or hovering object, in that row to perform the row and baseline alignment.

To minimize the mean square error, the partial derivatives of $R_j$ can be set to zero, $$\partial R_j = 2\Sigma_i W_{ij}(E_{ij} + R_j) + 2\gamma R_j = 0. \quad (33)$$

$R_j$ can be found, $$R_j = \frac{\sum_i W_{ij} E_{ij}}{\sum_i W_{ij} + \gamma}. \quad (34)$$

Next, the method of FIGS. 16A and 16B can perform in a similar manner as the method of FIGS. 15A and 15B (blocks 15034-15040) to calculate absolute row offsets A (16036), calculate a global offset $A_g$ (16038), adjust the absolute row offsets A with the global offset $A_g$ (16040), and apply the adjusted offsets $A_{j,f}$ to the noisy touch image C to construct an corrected touch image I (16042).

Figure 17:
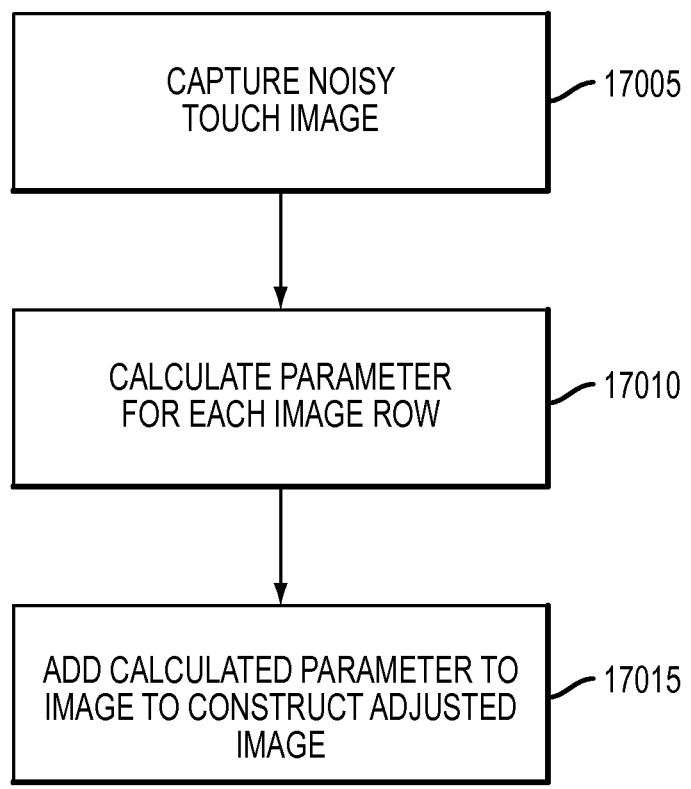
FIG. 17 is a flow chart that illustrates another exemplary method for constructing an corrected touch image from a noisy touch image based on image data according to various embodiments.

FIG. 17 illustrates another exemplary method for constructing an corrected touch image from a noisy touch image using the digitized scan results. In the example of FIG. 17, a noisy touch image C can be captured (17005). In some embodiments, a minimum data value $MIN_j$ for each image row j can be calculated (17010). The minimum data value can be added to the digitized scan results, thereby constructing the corrected touch image I from the noisy touch image C as follows (17015).

$$I_{ij} = C_{ij} - MIN_j. \quad (35)$$

In some embodiments, a median $MED_j$ of the negative data values of image row j can be calculated rather than $MIN_j$ (17010). The median can be added to the digitized scan results, thereby constructing the corrected touch image I from the noisy touch image C as follows (17015).

$$I_{ij} = C_{ij} - MED_j. \quad (36)$$

In some embodiments, a mode $MOD_j$ of the negative data values of image row j can be calculated rather than $MIN_j$ or $MED_j$ (17010). The mode can be added to the digitized scan results, thereby constructing the corrected touch image I from the noisy touch image C as follows (17015).

$$I_{ij} = C_{ij} - MOD_j. \quad (37)$$

In some embodiments, a mean or a weighted mean of the negative data values of each image row j can be calculated rather than $MIN_j$, $MED_j$, or $MOD_j$ and then added to the digitized scan results to construct the corrected touch image, similar to Equations (35)-(37). Any other suitable image data parameters can be used according to various embodiments.

Additional detail for the embodiments illustrated in FIGS. 13-17 can be found in U.S. patent application Ser. No. 13/448, 182, entitled "Reconstruction of Original Touch Image from Differential Touch Image" filed Apr. 16, 2012, The contents of U.S. patent application Ser. No. 13/448,182 are hereby incorporated by reference in their entirety.

It is to be understood that construction methods are not limited to those of FIGS. 13 through 17, but can include other or additional actions capable of constructing an corrected touch image from a noisy touch image according to various embodiments. It is further to be understood that the methods are not limited to noisy touch images, but can be applied to any appropriate images in need of construction. Although construction from offsets due to DC balancing is described, it is to be understood that the methods can be used to correct for any arbitrary set of row offsets.

Figure 18:
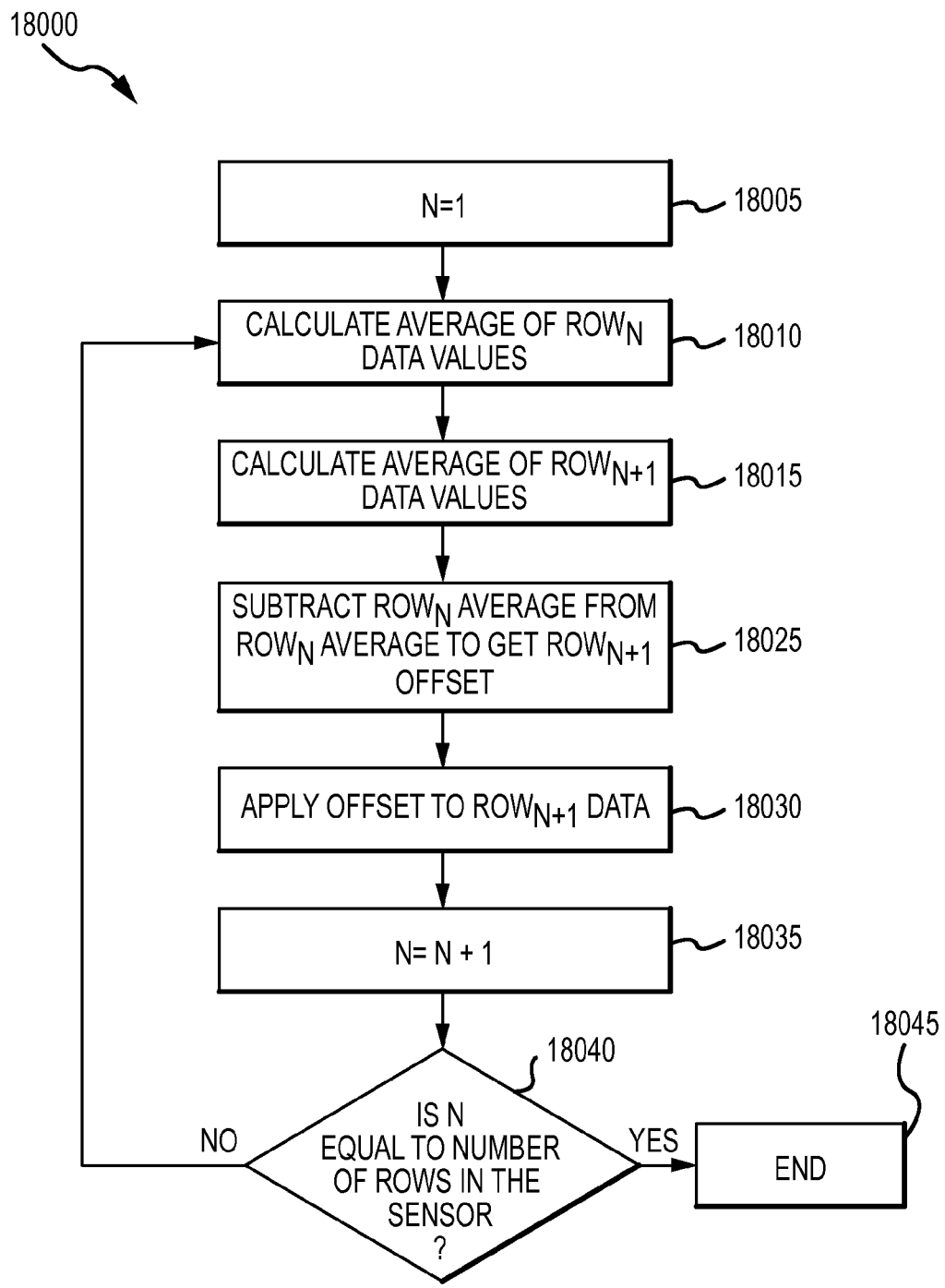
FIG. 18 is a flow chart further illustrating a row-to-row adjustment embodiment for the row-to-row adjustment operation shown in FIG. 5.

FIG. 18 is a flowchart 18000 that illustrates a method of applying a row-to-row adjustment in accordance with embodiments discussed herein. In the following discussion, the adjustment method 18000 is explained as being performed by operations of the touch processing module 2026. It should be appreciated, however, that the adjustment method 18000 may also be performed by operations of the fingerprint sensing module 2038 or other modules associated with the example system 2000 shown in FIG. 2. The method 18000 is one possible method by which the touch processing module 2026 may execute the row-to-row adjustment operation 5015 shown in FIG. 5.

Initially, in operation 18005, a row counter number such as "N" is set to an initial value of 1. The row counter number N is incremented throughout the method 18000 in order to cycle the system through the rows of sensor data that have been readout from the sensor array 3005, received a block-to-block adjustment, and stored in memory 3040. Once the row counter has been initialized in operation 18005, operation 18010 may be executed.

In operation 18010, the touch processing module 2026 calculates an average for the $row_N$ data values. The average of line n, can be calculated as follows:

$$Avg_n = \frac{1}{N} \sum_{i=0}^{N-1} block_i \quad (38)$$

Following operation 18010, operation 18015 may be executed. In operation 18015, the touch processing module 2026 calculates an average for the $row_{N+1}$ data values. The average of line n+1 can be calculate as follows:

$$Avg_{n+1} = \frac{1}{N} \sum_{i=0}^{N-1} block_i \quad (39)$$

Following operation 18015, operation 18025 may be executed. In operation 18025, the touch processing module 2026 subtracts the $row_{N+1}$ average from the $row_N$ average to arrive at an offset for the $row_{N+1}$ Calculating the offset in this way may be based on the assumption that adjacent rows have similar signal content. Thus:

$$Avg_{n+1} - Avg_n \approx \Delta V_{n+1} - \Delta V_n \quad (40)$$

Following operation 18025, operation 18030 may be executed. In operation 18030, the touch processing module 2026 applies the offset calculated in operation 18025 to the $row_{N+1}$ data. Following operation 18030, operation 18035 may be executed.

In operation 18035, the row counter value N is incremented by the touch processing module 2026. Following operation 18035, operation 18040 may be executed.

In operation 18040, the touch processing module 2026 determines if the row counter value N is equal to the number of rows in the sensing array 3005. If the process has reached the final row, the process may end in operation 18040. If the process has not yet reached the final row, control may pass to operation 18010 where the next row of data values is processed.

Figure 19:
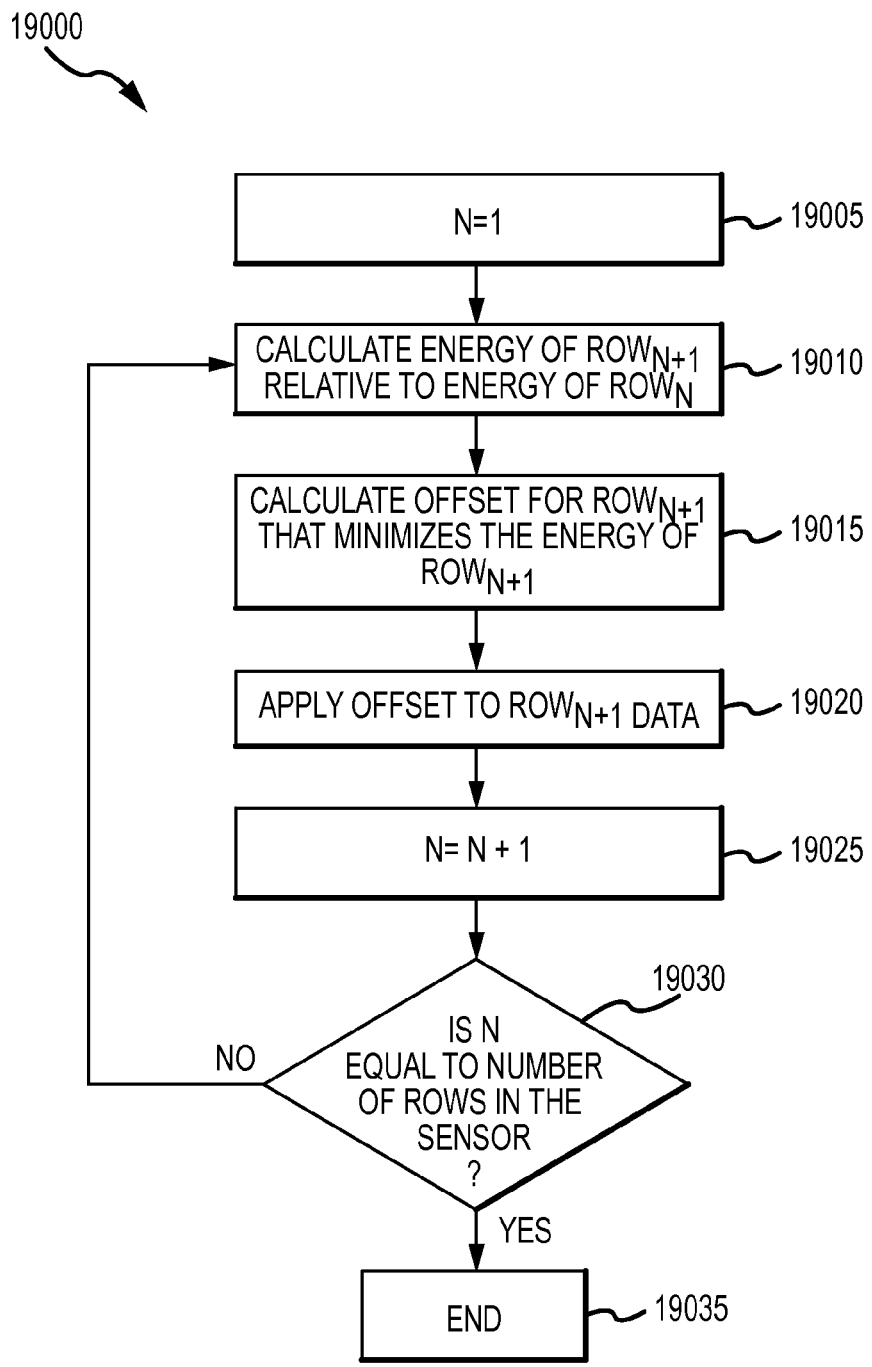
FIG. 19 is a flow chart further illustrating another row-to-row adjustment embodiment for the row-to-row adjustment operation shown in FIG. 5.

FIG. 19 is a flowchart 19000 that illustrates a method of applying a row-to-row adjustment in accordance with embodiments discussed herein. In the following discussion, the adjustment method 19000 is explained as being performed by operations of the touch processing module 2026. It should be appreciated, however, that the adjustment method 19000 may also be performed by operations of the fingerprint sensing module 2038 or other modules associated with the example system 2000 shown in FIG. 2. The method 19000 is one possible method by which the touch processing module 2026 may execute the row-to-row adjustment operation 5015 shown in FIG. 5. The method 19000 applies a grayscale difference calculation to arrive at an offset value for a particular row.

Initially, in operation 18005, a row counter number such as "N" is set to an initial value of 1. The row counter number N is incremented throughout the method 19000 in order to cycle the system through the rows of sensor data that have been readout from the sensor array 3005, received a block-to-block adjustment, and stored in memory 3040. Once the row counter has been initialized in operation 19005, operation 19010 may be executed.

In operation 19010, the touch processing module 2026 calculates the energy of $row_{N+1}$ relative to the energy of $row_{N+1}$. For each pair of rows, the energy is calculated as follows:

$$E_n^{nump} = \sum_{i=0} (V_{i,n} - V_{i,n-1})^2 \quad (40)$$

Following operation 19010, operation 19015 may be executed. In operation 19015, the touch processing module 2026 calculates an offset for $row_{N+1}$ that minimizes the energy of $row_{N+1}$. Following operation 19015, operation 19020 may be executed.

In operation 19020, the touch processing module 2026 applies the offset calculated in operation 19015 to the data values for $row_{N+1}$. Following operation 19020, operation 19025 may be executed.

In operation 19025, the row counter value N is incremented by 1. Following operation 19025, operation 19030 may be executed.

In operation 19030, the touch processing module 2026 determines if the row counter value N is equal to the number of rows in the sensor. If the number of rows in the sensor has been reached by the counter, control may pass to operation 19035 where the process may end. If the number of rows in the sensor has not been reached, control may again pass to operation 19010 where the next subsequent row adjustment offset is calculated.

Figure 20:
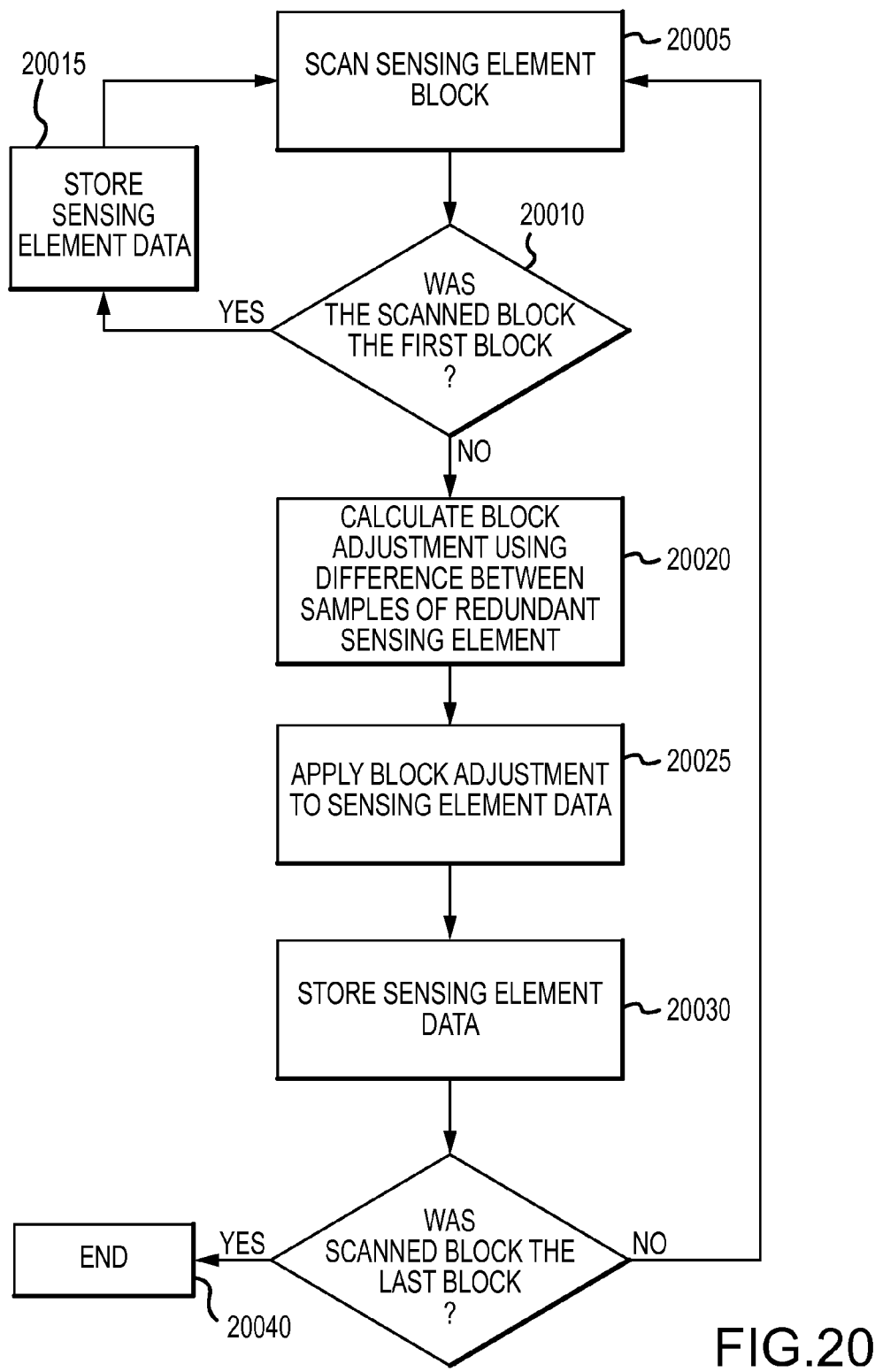
FIG. 20 is a flow chart illustrating an additional scanning method in accordance with various embodiments.

FIG. 20 is a flowchart 20000 that illustrates a scanning method in accordance with embodiments discussed herein. The scanning method 2000 shown in FIG. 20 uses a redundant sensing element between rows to apply a row-to-row adjustment. Initially, in operation 20005, the touch processing module 2026, scans a sensing element block. Following operation 20005, operation 20010 may be executed.

In operation 20010, the touch processing module 2026 determines if the scanned block was the first block in the sensor array. If scanned block was the first block in the sensor array, control may pass to operation 20015. If not, control may pass to operation 20020.

In operation 20015, the touch processing module 2026 stores the sensing element data for the first block in the sensor array. In operation 20015, no adjustment is made to the sensor data because no prior block has been scanned and therefore no redundant sensing element data is available to make a comparison adjustment.

In operation 20020, the touch processing module 2026 calculates a block adjustment using the difference between samples of redundant sensing elements. The adjustment made in operation 20020, may be a block-to-block adjustment as described above in connection with FIG. 6 or it may be a row-to-row adjustment. To better illustrate the row-to-row adjustment using a redundant sensing element, reference is made to FIG. 21 which includes a sampling diagram having a redundant sensing element between rows. As can seen in the sampling diagram 21000 of FIG. 21, the last block in a row and the first sensing element in the next subsequent are sampled at the same time. In this way, redundant sensing element data is available for the first block in the next subsequent row. Accordingly, an offset for the first block in the next subsequent row can be calculated by taking the difference between the two samplings of the redundant sensing element. Here, it can be seen that the method illustrated by FIG. 20 has the advantage of providing a direct measurement of the variation in the noise level of the sensor apparatus that occurs from row to row.

Following operation 20020, operation 20025 may be executed. In operation 20025, the touch processing module 2026 applies the adjustment calculated in operation 20020 to the sensing element data for the current block. Following operation 20025, operation 20030 may be executed.

In operation 20030, the touch processing module 2026 stores the sensing element data including the adjustment made in operation 20025. Following operation 20030, operation 20035 may be executed.

In operation 20035, the touch processing module 2026 determines if the current block scan was the last block in the scanner. If the last block in the scanner was scanned, the control may pass to operation 20040 where the process may end. If the last block has not been scanned, control may again pass to operation 20005 when the next block is scanned.

The method illustrated by FIG. 20 has the advantage of providing a direct measurement of the variation in the noise level of the sensor apparatus that occurs from row to row.

Figure 21:
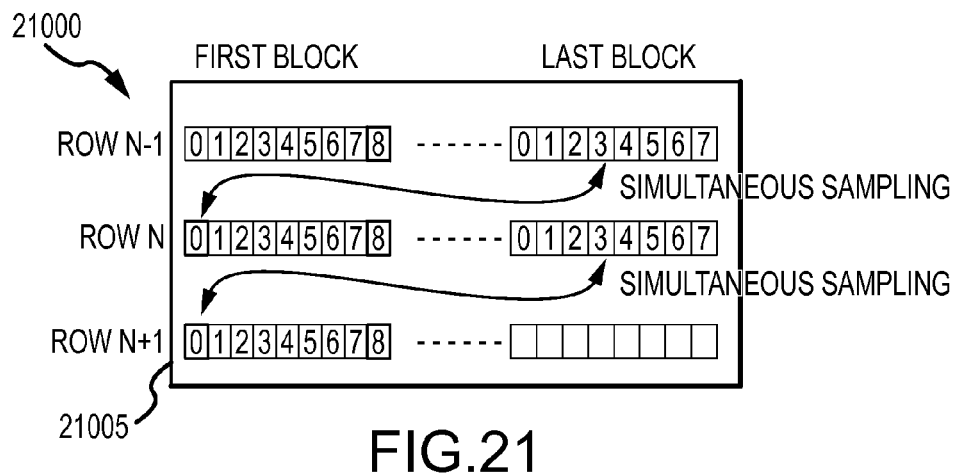
FIG. 21 is a sampling diagram that illustrates the scanning operation shown in FIG. 20.

FIG. 21 shows how a redundant sensing element may be used between rows. For example, the last block of $Row_{N-1}$ and the sensing element 0 in the first block of $Row_N$ may be sampled simultaneously. That same element 0 in the first block of $Row_N$ is the redundantly sampled again when the entire first block of $Row_N$ is sampled as a group. Similarly, the last block of $Row_N$ and the sensing element 0 in the first block of $Row_{N+1}$ may be sampled simultaneously. That same element 0 in the first block of $Row_{N+1}$ is the redundantly sampled again when the entire first block of $Row_{N+1}$ is sampled as a group.

Figure 22:
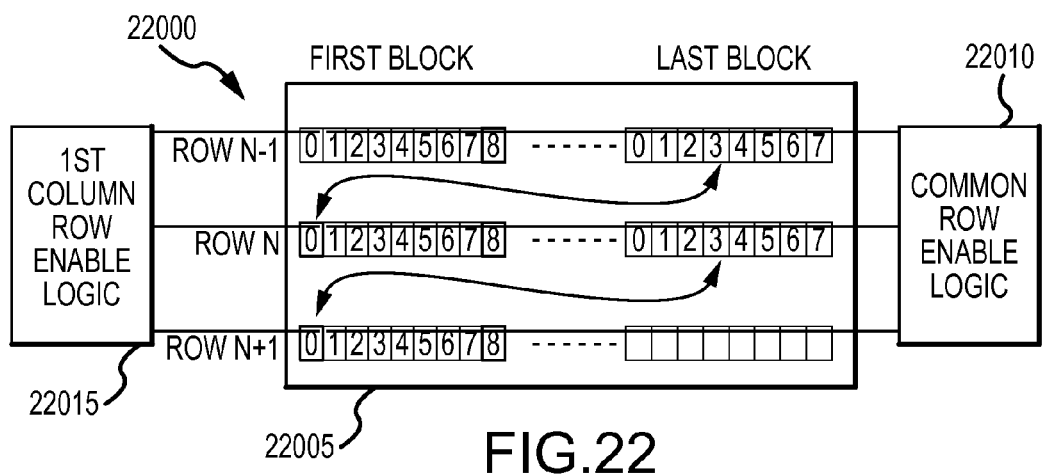
FIG. 22 is a wiring diagram that may be used to implement the scanning operation shown in FIG. 20.

FIG. 22 is a wiring diagram that may be used to implement the scanning operation shown in FIG. 20. FIG. 22 is a wiring diagram for a sensor array 3005 such as the one shown in FIG. 3. The wiring differs for a typical wiring of a sensing array in that row enable lines are common to all of the sensing elements in each row except the first column. In this regard, the wiring shown in FIG. 22 includes common row enable logic 22010 and first column row enable logic 22015. The common row enable logic 22010 drives the entire row sensing elements excluding the sensing element in the first column. The first column row enable logic 22015 independently drives the sensing element in the first column. Those row select lines are electrically independent from the row select lines that control all of the other columns. By enabling the sensing element in the first column independently from the other sensing elements in a row, the sensing array is able to scan the last block in a row and the first sensing element in the next subsequent at the same time. More specifically, when the last block is being sampled for $Row_{N-1}$, the common row enable logic 22010 will enable the row select line for $Row_{N-1}$, simultaneously with first column row enable logic 22015 enabling row select line for $Row_N$. As such, element 0 of first block in Row N will be sampled simultaneously with the last block of $Row_{N-1}$.

CONCLUSION

Although embodiments have been fully described with reference to the accompanying drawings, it is to be noted that various changes and modifications will become apparent to those skilled in the art. Such changes and modifications are to be understood as being included within the scope of the various embodiments as defined by the appended claims. The foregoing description has broad application. Accordingly, the discussion of any embodiment is meant only to be an example and is not intended to suggest that the scope of the disclosure, including the claims, is limited to these examples.

What is claimed is:

1. A method of compensating for the presence of noise in a touch sensing device, comprising
    sampling a sensing element in a scan of a first data block to form a first value;
    redundantly sampling the same sensing element in a scan of a different second data block to form a second value;
    calculating an offset by subtracting the second value from the first value; and
    adjusting the second data block by adding the offset to each data value of the second data block.

2. The method of claim 1, wherein
    the first data block is offset from a fixed reference by a first amount;
    prior to the operation of adjusting the second data block, the second data block is offset from the fixed reference by a second amount; and
    following the operation of the adjusting the second data block; the second data block is offset from the fixed reference by the first amount.

3. The method of claim 2, wherein the fixed reference is ground.

4. The method of claim 2, wherein the first and second data blocks correspond to first and second sensing element blocks of an array, the method further comprising
    scanning a plurality of additional sensing element blocks in the array to form a plurality of additional data blocks;
    adjusting the additional data blocks such that each additional data block is offset from the fixed reference by the first amount.

5. The method of claim 4, further comprising
    storing the offset as a cumulative offset;
    adding an additional offset to the cumulative offset for each scan of an additional data block, the additional offset being the difference between a sampled data value from a data block immediately prior to the additional data block and a redundantly sampled data value from the additional data block;
    wherein for each additional data block, the operation of adjusting the additional data blocks includes adding the cumulative offset to each data value of the additional data block.

6. The method of claim 4, wherein
the plurality of additional sensing element blocks are members of a first row of sensing element blocks; and
the first data block, the second data block, and the additional data blocks are members of a first row of data blocks, the method further comprising
scanning a second row of sensing element blocks to form a plurality of second row data blocks;
adjusting the second row of data blocks such that each data block in the second row is offset from the fixed reference by a third amount; and
adjusting the first and second rows of data blocks such that the first row of data blocks is offset from the fixed reference by an amount equal to an amount by which the second row of data blocks is offset from the fixed reference.

7. A method of compensating for the presence of noise in a touch sensing device, comprising
forming a data set by sequentially sampling an ordered array of sensing element blocks, the data set having rows of data blocks corresponding to rows of the ordered array;
applying a block-to-block adjustment to the data set based on redundant data values within the data set to form a partially compensated data set, wherein the redundant data values comprise data values that are sampled at least twice from redundant sensing elements in at least some of the sensing element blocks; and
applying a row-to-row adjustment to the partially compensated data set to form a compensated data set.

8. The method of claim 7, wherein each row of data blocks in the data set comprises an ordered set of data blocks beginning with a first block, the operation of applying the block-to-block adjustment further comprising, for each subsequent data block after the first data block in each row
calculating a block offset by subtracting a redundant data value of the subsequent data block from a redundant data value of a data block immediately prior to the subsequent data block;
calculating a cumulative offset as a sum of all the block offsets between the first data block and the subsequent data block;
adjusting the subsequent data block by adding the cumulative offset to each data value within the subsequent data block.

9. The method of claim 8, the operation of forming the data set further comprising, for each subsequent data block after the first block in each row
forming the redundant data value of the data block immediately prior to the subsequent data block by sampling a redundant sensing element a first time when a block of the array corresponding to the data block immediately prior to the subsequent data block is sampled, and
forming the redundant data value of the subsequent data block by sampling the redundant sensing element a second time when a block of the array corresponding to the subsequent data block is sampled.

10. A method of compensating for the presence of noise in a touch sensing device, comprising
sampling a first block of sensing elements to form a first sampled data block;
storing the sampled data block to form a first stored data block;
sampling a plurality of subsequent blocks of sensing elements to form a plurality of sampled subsequent data blocks;
for each of the sampled subsequent data blocks:
adding a stored cumulative offset to the sampled subsequent data block to form an adjusted subsequent data block; and
storing the adjusted subsequent data block to form a stored subsequent data block.

11. The method of claim 10, further comprising
storing a redundant data value of the first sampled data block as the stored cumulative offset; and
for each of the sampled subsequent data blocks and prior to the operation of adding the stored cumulative offset to the sampled subsequent data block:
adding the stored cumulative offset to a redundant data value of the sampled subsequent data block to form an adjusted cumulative offset;
storing the adjusted cumulative offset as the stored cumulative offset.

12. The method of claim 11, wherein
the redundant data value of each sampled subsequent data block is associated with a redundant sampling element;
the redundant sampling element being sampled a first time when the data block immediately prior to the subsequent data block is sampled; and
the redundant sampling element being sampled a second time when the subsequent data block is sampled.

13. A sensor apparatus, comprising
an array of sensing element arranged in rows of sensing element blocks, the array including a plurality of redundant sensing elements, each individual one of the redundant sensing elements contained within two adjacent sensing element blocks;
a block address input configured to receive input that specifies an individual one of the sensing element blocks; and
a read channel output configured to output data from the individual one of the sensing element blocks responsive to the input received at the block address input.

14. The sensor apparatus of claim 13, further comprising
a sampling block connected to the read channel output from the sensor array, the sampling block configured to sample the read channel of the array and to provide the sampled data on corresponding output lines.

15. The sensor apparatus of claim 14, further comprising
a multiplexor connected to the output lines of the sampling block, the multiplexor configured to convey output from one of the output lines of sampling block to a multiplexor output responsive to a channel selector input.

16. The sensor apparatus of claim 15, further comprising
an analog-to-digital converter connected to the output of the multiplexor; and
a memory connected to the output of the analog-to-digital converter.

17. The sensor apparatus of claim 16, further comprising a processor connected to the memory, wherein
the memory contains a data set of sequentially sampled sensing element blocks, the data set having rows of data blocks corresponding to rows of the array;
the processor configured to apply a block-to-block adjustment to the data set based on redundant data values within the data set to form a partially compensated data set; and
the processor configured to apply a row-to-row adjustment to the partially compensated data set to form a compensated data set.

18. The sensor apparatus of claim 16, further comprising
a first register connected to the output of the analog-to-digital converter, the first register configured to store a digital value for a redundant sensing element as sampled in an immediately prior block scan;

a second register connected to the output of the analog-to-digital converter, the second register configured to store a digital value for the redundant sensing element as sampled in a current block scan;

a first adder having a first input connected to the output of the first register and a second input connected to the output of the second register, the first adder configured to provide an output representing the difference between the value output by the first register and the value output by the second register; and a second adder having a first input connected to the output of the first adder, a second input connected to the output of the analog-to-digital converter, the second adder configured to provide an output representing the difference between the value output by the analog-to-digital converter and the value output by the first adder; the output of the second adder connected to the memory.

19. The sensor apparatus of claim 16, further comprising a data store connected to an output of the sampling block;

a first adder having a first input connected to the output of the data store, a second input connected to an output of the sampling block, and an output; and a second adder having a first input connected to the output of the multiplexor, a second input connected to the output of the first adder, and an output connected to the analog-to-digital converter.

20. The sensor apparatus of claim 13, wherein the block address input further comprises a first column row enable that enables only the first sensing element of the first sensing element block of a particular row; and a common row enable configured to enable all of the sensing elements except the first sensing element in a sensing element block if the first sensing element block is specified, and configured to enable all of the sensing elements in a sensing element block if the first sensing element block is not specified.

* * * * *